United States Patent [19]

Vornberger

[11] E Re. 29,120

[45] Reissued Jan. 25, 1977

[54] CEMENT LASTING THE SIDE AND HEEL PORTIONS OF A SHOE ASSEMBLY

[75] Inventor: Walter Vornberger, Tewksbury, Mass.

[73] Assignee: International Shoe Machine Corporation, Nashua, N.H.

[22] Filed: May 24, 1976

[21] Appl. No.: 689,392

Related U.S. Patent Documents

Reissue of:

[64] Patent No.: 3,945,075
Issued: Mar. 23, 1976
Appl. No.: 578,682
Filed: May 19, 1975

U.S. Applications:

[62] Division of Ser. No. 467,522, May 6, 1974.

[52] U.S. Cl. ..... 12/145; 12/10.5

[51] Int. Cl.[2] ..... A43D 21/00

[58] Field of Search ..... 12/10.1, 10.5, 10.8, 12/12.4, 14.2, 127, 145

[56] References Cited

UNITED STATES PATENTS

| | | | |
|---|---|---|---|
| 3,035,287 | 5/1962 | Vlcek et al. | 12/12.4 |
| 3,359,586 | 12/1967 | Kamborian | 12/145 |
| 3,397,417 | 8/1968 | Kamborian | 12/145 |
| 3,579,695 | 5/1971 | Boot et al. | 12/127 |

FOREIGN PATENTS OR APPLICATIONS

| | | | |
|---|---|---|---|
| 1,222,707 | 2/1971 | United Kingdom | 12/10.5 |

*Primary Examiner*—Patrick D. Lawson
*Attorney, Agent, or Firm*—Albert Gordon

[57] ABSTRACT

A machine that includes nozzles that move along and apply cement in the corners between the side and heel portions of an upper mounted on a last and the corresponding portions of an insole located on the last bottom and that also includes side wipers and heel wipers that respectively wipe the side and heel portions of the upper margin against the insole and attach the wiped margin portions of the insole by means of the cement.

5 Claims, 35 Drawing Figures

CEMENT LASTING THE SIDE AND HEEL PORTIONS OF A SHOE ASSEMBLY

Matter enclosed in heavy brackets [ ] appears in the original patent but forms no part of this reissue specification; matter printed in italics indicates the additions made by reissue.

This is a division of application Ser. No. 467,522 filed May 6, 1974.

BACKGROUND OF THE INVENTION

U.S. patent application Ser. No. 386,129 filed Aug. 6, 1973, *which has been granted as U.S. Pat. No. 3,831,216*, discloses a cement lasting machine operable on the side portions of a shoe assembly comprised of a last having an upper mounted thereon and an insole located on its bottom. The machine includes a shoe assembly support that supports the shoe assembly bottom-up and cement applying members, in the form of nozzles, that are yieldably urged downwardly by a downwardly directed force against the insole and outwardly by outwardly directed forces into corners between the side portions of the upper margin and the corresponding portions of the insole periphery. The nozzles are caused to travel rearwardly in the corners while the downwardly and outwardly directed forces are maintained, from the boundaries between the previously wiped upper margin of the toe portion of the shoe assembly and the upper margin of the side portions of the shoe assembly to the boundaries between the upper margin of the side portions of the shoe assembly and the previously wiped upper margin of the heel portion of the shoe assembly, and cement is extruded through the nozzles into these corners during this travel. The rearward travel of the nozzles is terminated by the engagement of a cam, travelling in unison with the nozzles, with a stop member that is mounted in the machine and whose position can be manually adjusted. After the application of the cement in the corners, the side portions of the upper margin are wiped against and adhesively bonded to the insole by side wiping instrumentalities. The shoe assembly is clamped in position for the application of the cement between the shoe assembly support and a hold-down that bears against the insole, the support being raised to cause the insole to bear against the hold-down.

U.S. Pat. No. 3,506,992 discloses a heel lasting machine wherein a shoe assembly having an upper mounted thereon and an insole located on its bottom is supported bottom-up on a support and the support is raised until the insole bears against a hold-down to thereby clamp the shoe assembly between the support and the hold-down. This is followed by the movement of a plate carrying a heel clamp and heel wipers until the bight of the heel clamp, that acts as a work engaging member, engages the heel end of the shoe assembly to thus locate the heel clamp in proper position for clamping the heel portion of the upper against the last and locate the heel wipers in proper position for wiping the heel portion of the upper margin against the insole. The heel wipers move in a planar path and the hold-down is so located as to position the heel portion of the insole in a plane that is substantially parallel to this path and is substantially coplanar with the bottoms of the wipers.

U.S. Pat. No. 3,422,474 shows a cement lasting machine that includes heel wipers and side wipers that wipe the heel and side portions of an upper margin against an insole after cement has been applied into the corners between these portions of the upper margin and the corresponding portions of the insole periphery by nozzles that travel along these corners.

SUMMARY OF THE INVENTION

A first aspect of this invention is concerned with a cement lasting machine that applies cement in the corners between the side and heel portions of the upper margin and the insole periphery by nozzles that travel along these corners and that includes side and heel wipers for wiping the side and heel portions of the upper margin against the insole as in U.S. Pat. No. 3,422,474. The machine includes a cam travelling in unison with the nozzle that engages a stop member to terminate the travel of the nozzles as in application Ser. No. 386,129. The machine also includes a heel clamp that is moved by a plate towards the heel portion of the shoe assembly until the bight of the heel clamp engages the heel end of the shoe assembly as in U.S. Pat. No. 3,506,992.

An object of this first aspect of the invention is to automatically locate the stop so that it will be engaged by the cam to terminate the travel of the nozzles when the nozzles are proximate to the heel ends of the corners regardless of the length of the shoe assembly and the locations of the heel ends of the corners. This object is achieved by so connecting the heel clamp and the stop that the stop is moved in unison with the clamp during the movement of the heel clamp towards the heel end of the shoe assembly.

In its broadest variant, the first aspect of the invention is concerned with a machine for applying cement along a surface of any workpiece up to a desired location on the workpiece by a cement applying member that moves along the surface up to the desired location. An object of this variant is to automatically stop the movement of the cement applying member at this desired location regardless of the length of the workpiece. This object is achieved by having a cam, that is movable with the cement applying member, engage a stop surface of a stop member, the stop member being connected for movement in unison with a workpiece engaging member that is moved into engagement with an end of the workpiece.

A second aspect of the invention is concerned with a cement lasting machine having the arrangement for clamping the shoe assembly between the support and the hold-down and having the heel wipers as in U.S. Pat. No. 3,506,992 and having the nozzles moving along the corners between the upper margin and the insole to apply cement in these corners as in application Ser. No. 386,129. In this aspect of the invention, the nozzles travel in the corners of the heel portion of the shoe assembly preparatory to the heel wipers wiping the heel portion of the upper margin against the insole. A difficulty arises with this arrangement due to the nozzles having to travel past the hold-down and thus being interfered with by the hold-down. An object of this aspect of the invention is to obviate this difficulty.

The difficulty referred to in the preceding paragraph is obviated by providing a brake that coacts with a bar, to which the shoe assembly support is secured and from which the shoe assembly support extends upwardly, to lock the shoe assembly against movement during the cement applying operation by the nozzles and the wiping operation by the heel wipers. The machine is so operated that, after the shoe assembly is clamped between the support and the hold-down, the brake is caused to lock the bar together with the shoe support against movement. This is followed by a removal of the hold-down from the insole out of interfering relation with the nozzles, the cement applying movement of the nozzles and the heel wiping operation of the heel wipers.

The second aspect of the invention has utility regardless of whether the cementing and wiping operations are performed on the toe portion or the heel portion of the shoe assembly, regardless of whether the cement applying member is a nozzle and regardless of how many cement applying members are used. Therefore, in its broadest variant, this aspect of the invention has wipers that are not necessarily heel wipers and the corner in which the cement is applied by a cement applying member is not necessarily in the heel portion of the shoe assembly.

In moving the nozzles into the corners, in the manner disclosed in application Ser. No. 386,129, it is desirable that the nozzles first move against the insole and then move outwardly into the corners. By moving the nozzles in this sequence, assurance is provided that the nozzles do not tangle with the upper margin which, at this time, is overhanging the insole and that the nozzles do not move outwardly of the upper margin before moving downwardly. A third aspect of the invention is concerned with a mechanism for ensuring that this desired sequence of nozzle movement takes place.

The mechanism of the third aspect of the invention includes a control operative to cause a drive mechanism to move a cement applying member (disclosed as a nozzle) outwardly and an actuator connected to the cement applying member for movement therewith during the movement of the cement applying member towards the insole. The actuator is so located as to intersect the control pursuant to the movement of the cement applying member against the insole and this intersection is effective to operate the drive mechanism.

In the disclosure of application Ser. No. 386,129, the nozzles are caused to move along the corners and apply cement into the corners after they have been urged yieldably outwardly into the corners. During their movement along the corners, the nozzles continue to be urged yieldably outwardly so that they will stay in the corners. The nozzles should be urged yieldably outwardly under relatively low pressure during their travel along the corners to ensure that they will not tear or gouge the upper margin during their movements. However, the nozzles should initially be urged rapidly outwardly to ensure that they are in the corners when they commence their movements along the corners and to minimize the duration of the sequence of operations. A fourth aspect of the invention is concerned with ensuring that the nozzles perform in this desired manner.

In accordance with the fourth aspect of the invention, a cement applying mechanism, disclosed herein as a nozzle, is yieldably urged outwardly into the corner under relatively high pressure. After this, the cement applying mechanism is yieldably urged outwardly under relatively low pressure, and this is followed by the movement of the cement applying member along the corner while the cement applying member continues to be yieldably urged outwardly under the relatively low pressure.

DESCRIPTION OF THE PREFERRED EMBODIMENT

Figure 1:
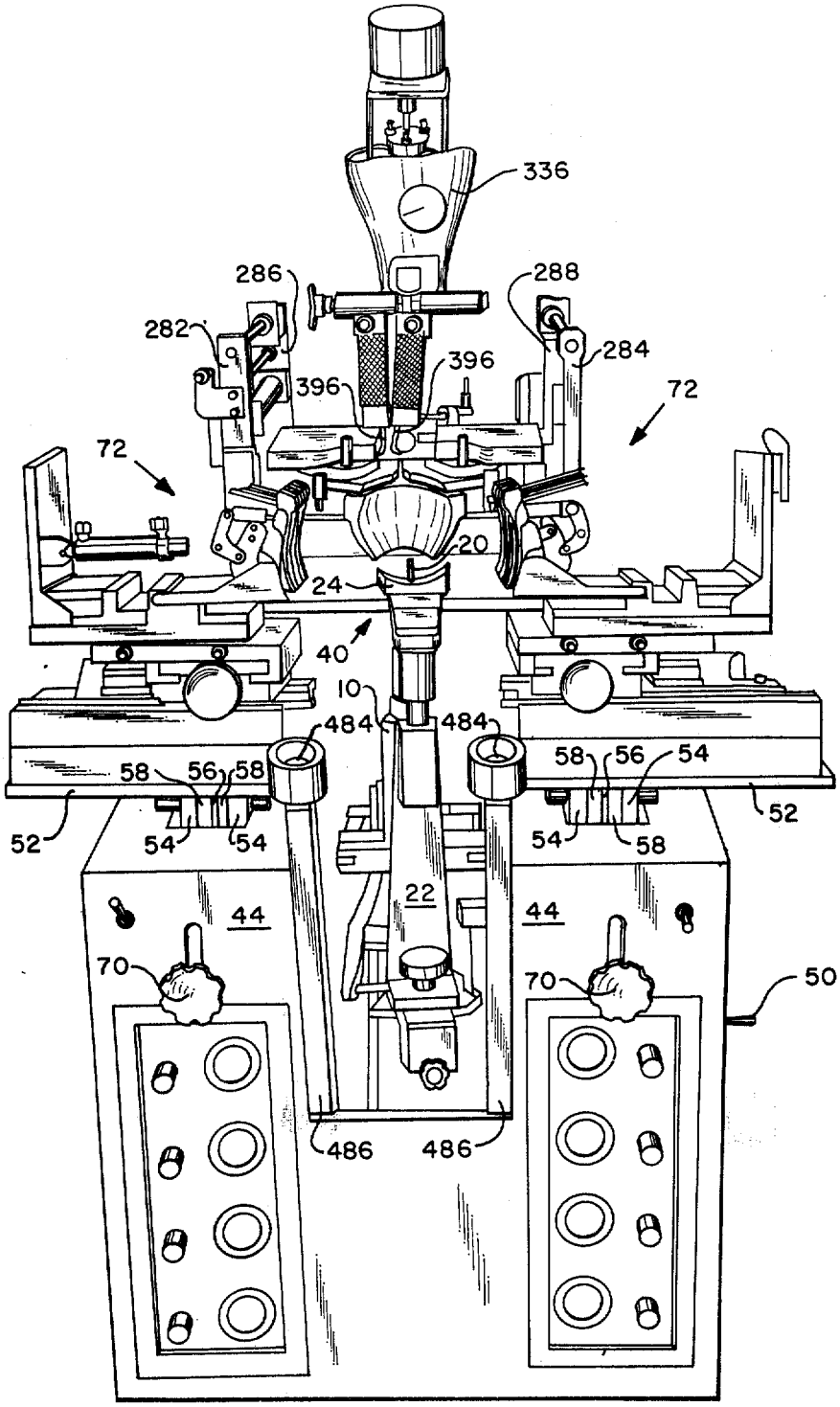
FIG. 1 is a front view of the machine.
Figure 8:
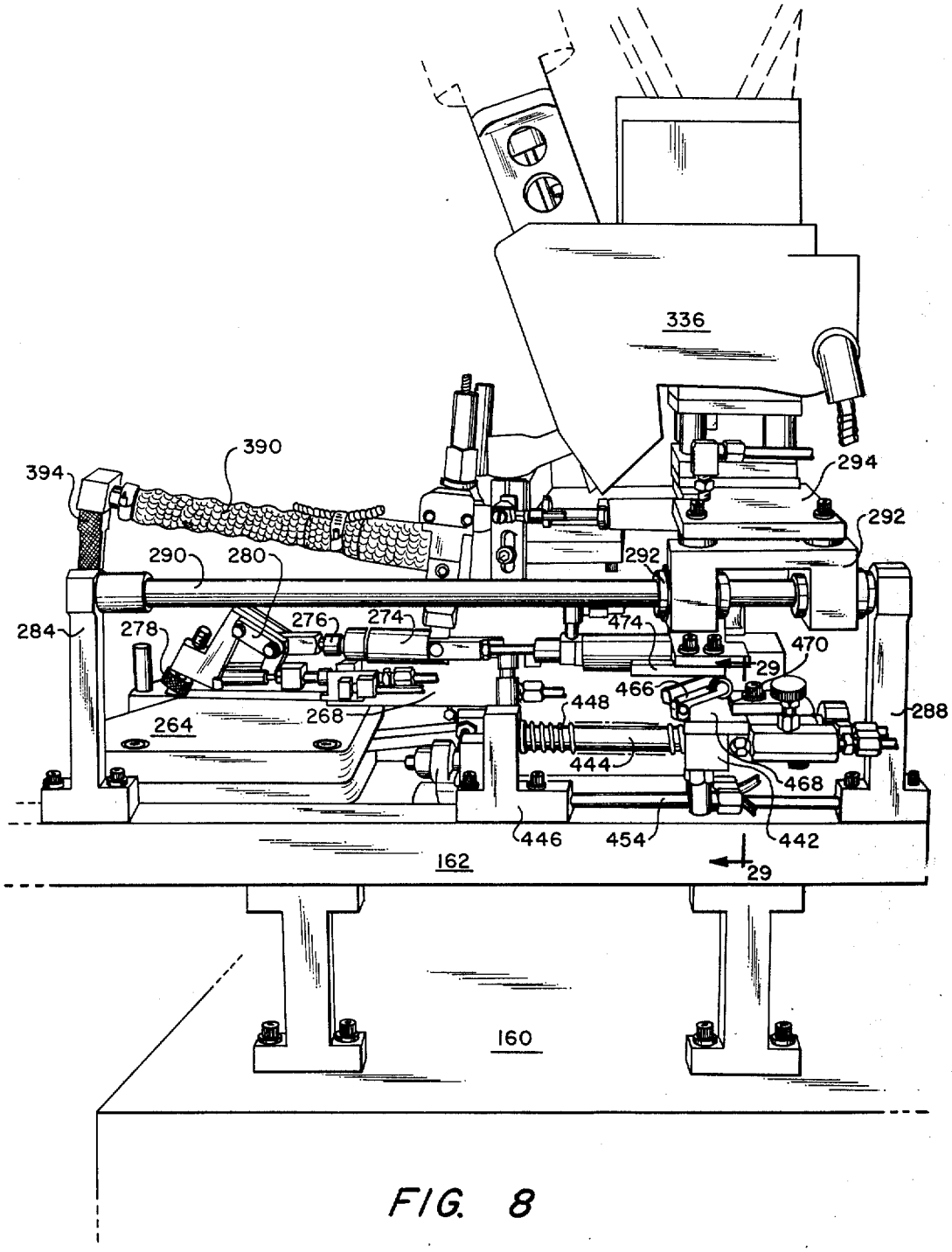
FIGS. 8 and 9 are side views of portions of the machine.

The operator is intended to stand in front of the machine as seen in FIG. 1 and to the left of the machine as seen in FIG. 8. Directions extending towards the operator (right to left in FIG. 8) will be designated as "forward" and directions extending away from the operator (left to right in FIG. 8) will be designated as "rearward". The front of the machine is closest to the operator and the back of the machine is furthermost from the operator.

Referring to FIGS 1–4, the machine includes a sleeve 10 that is fixedly mounted to a stationary bracket 12. A bar 14 is mounted in the sleeve 10 for heightwise movement. An air operated motor 16, that is secured to the bracket 12, has an upwardly extending piston rod 18 that is secured to the bottom of the bar 14, whereby the motor 16 can effect heightwise movement of the bar 14. A last pin 20 is secured to the top of the bar 14. A column 22 is mounted to and is located forwardly of a flange 38, described below, that is secured to the bar 14. A toe rest 24 is mounted to the top of the column 22.

Figure 3:
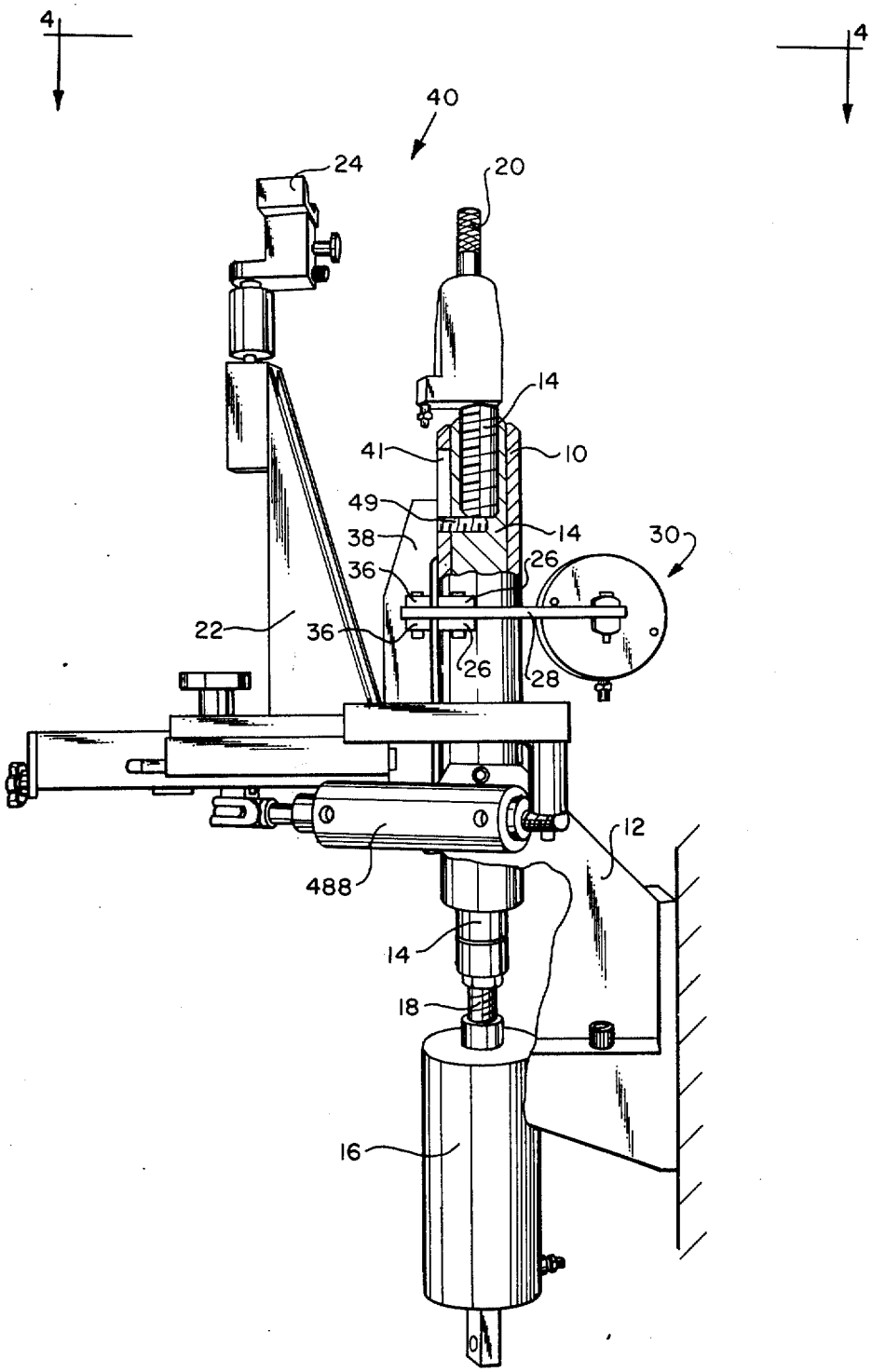
FIG. 3 is an elevation of the shoe assembly support.
Figure 4:
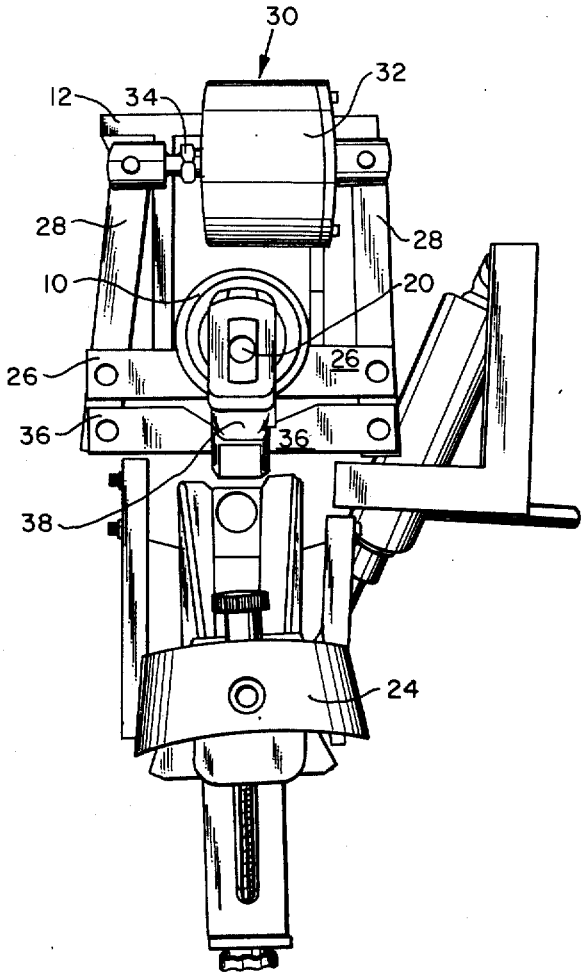
FIG. 4 is a planview taken on the line 4—4 of FIG. 3.

A set of mounting fingers 26 extends laterally of each side of the sleeve 10, each set of fingers 26 being secured to the sleeve 10. An arm 28 is pivoted intermediate its ends to the outermost extremity of each set of fingers 26. An air operated motor 30, formed of a cylinder 32 and a piston rod 34, is located between the rear ends of the arms 28. The cylinder 32 is pivotally connected to the rear end of one of the arms 28 and the piston rod 34 is pivotally connected to the rear end of the other of the arms 28. A set of brake fingers 36 is mounted to the front of each arm 28, the sets of brake fingers extending inwardly of their associated arms 28 towards the flange 38. The flange 38 is mounted to the front of the bar 14 by means of screws 49 (only one of which is shown in FIG. 3) that connect the flange 38 and the bar 14 and that extend through slots 41 in sleeve 10.

The last pin 20 and the toe rest 24 constitute a work support 40 for supporting a shoe assembly described below.

Figure 5:
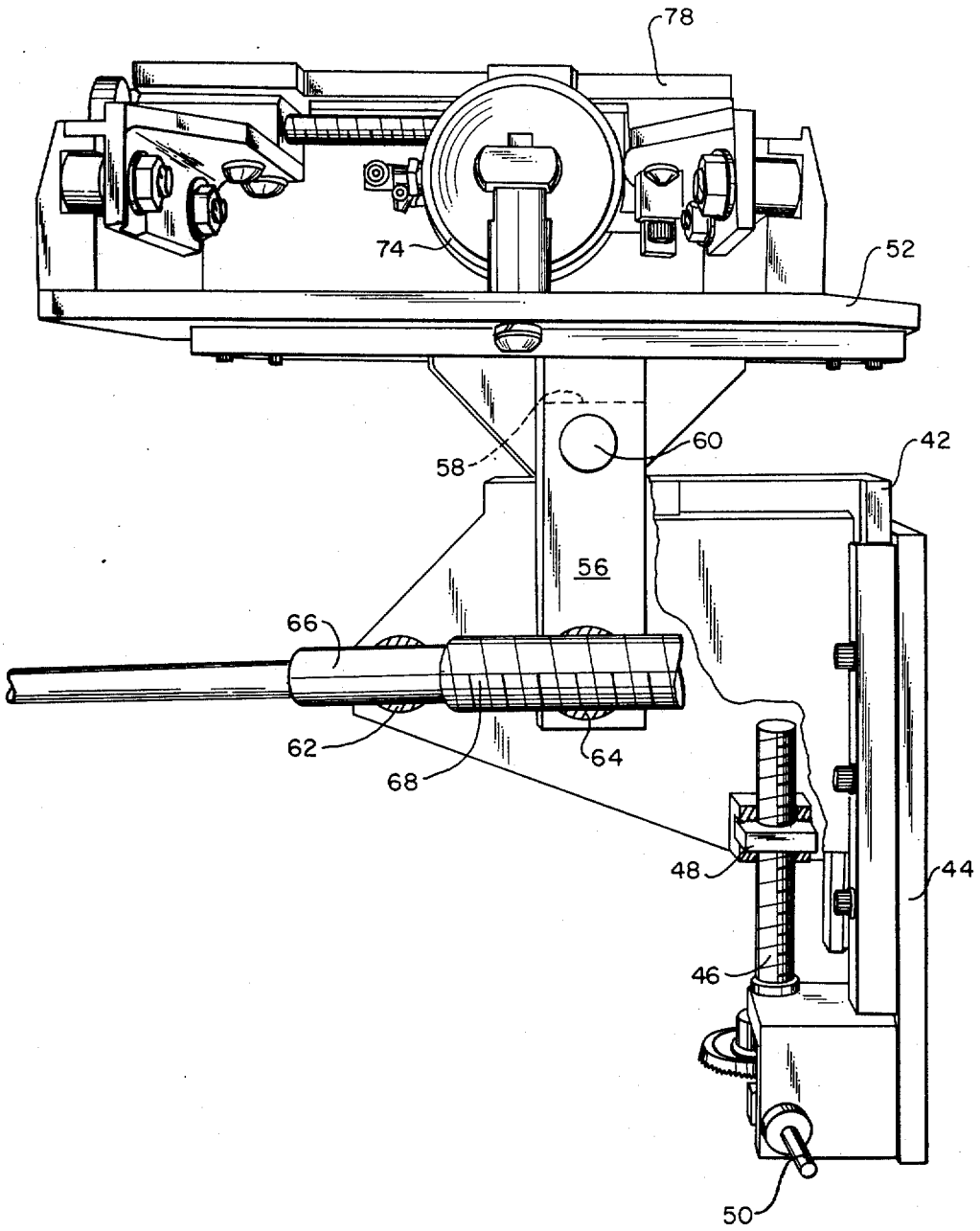
FIG. 5 is a view of a mechanism for adjusting the elevation and inclination of a side lasting unit.

Referring to FIGS. 1 and 5, a beam 42 is located on each side of the support 40 and each beam 42 is mounted to the machine frame 44 for heightwise movement. A bolt 46 that is rotatably mounted in the machine frame 44, is threaded into a nut 48 that is secured to each beam 42 whereby rotation of each bolt 46 effects heightwise movement of its associated beam 42. Each bolt 46 is so connected to a shaft 50 extending out of the side of the machine frame 44 as to enable rotation of each shaft to rotate its associated bolt 46. A table 52 is located above each beam 42. A pair of spaced side flanges 54 (FIG. 1), depend from each table 52, and a center flange 56 depends from each table between its associated sides flanges 54. The flanges 54 and 56 receive between them flanges 58 that are upstanding from the associated beam 42. A pivot pin 60 extends through each group of flanges 54, 56, and 58 whereby each table 52 is pivotally mounted for swinging movement about the transversely extending prone axis of its associated pin 60. A bar 62 is rotatably mounted in each beam 42 and a bar 64 is rotatably mounted in the bottom of each flange 56. A shaft 66, rotatably mounted in each bar 62, has a threaded extension 68 that is threaded into a bar 64 whereby rotation of each shaft 66 causes its associated flange 56 and table 52 to swing about the axis of its associated pin 60. A knob 70 (FIG. 1) is secured to the point of each shaft 66 to facilitate the rotation of the shafts 66.

Figure 2:
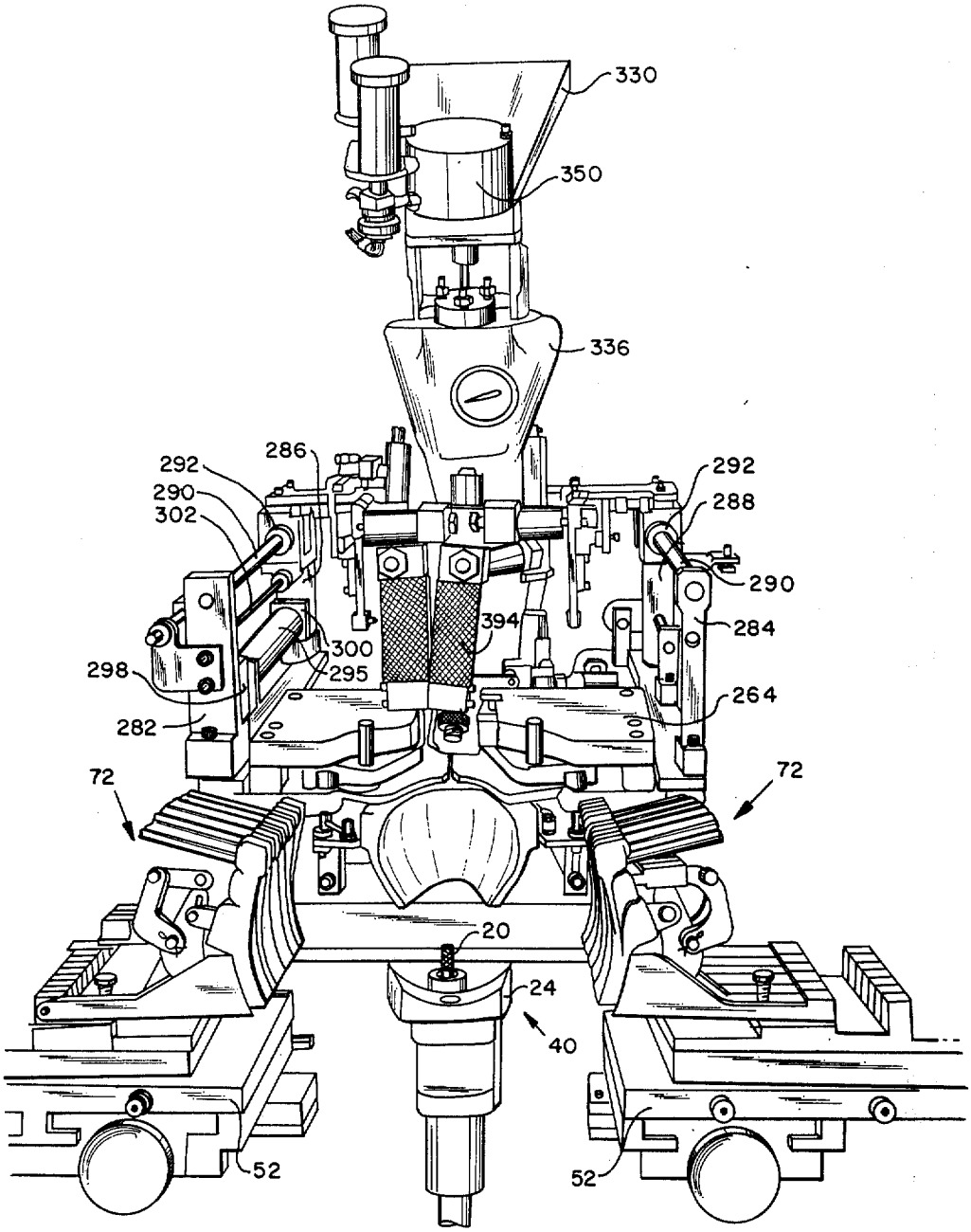
FIG. 2 is a front view of the upper portion of the machine.
Figure 6:
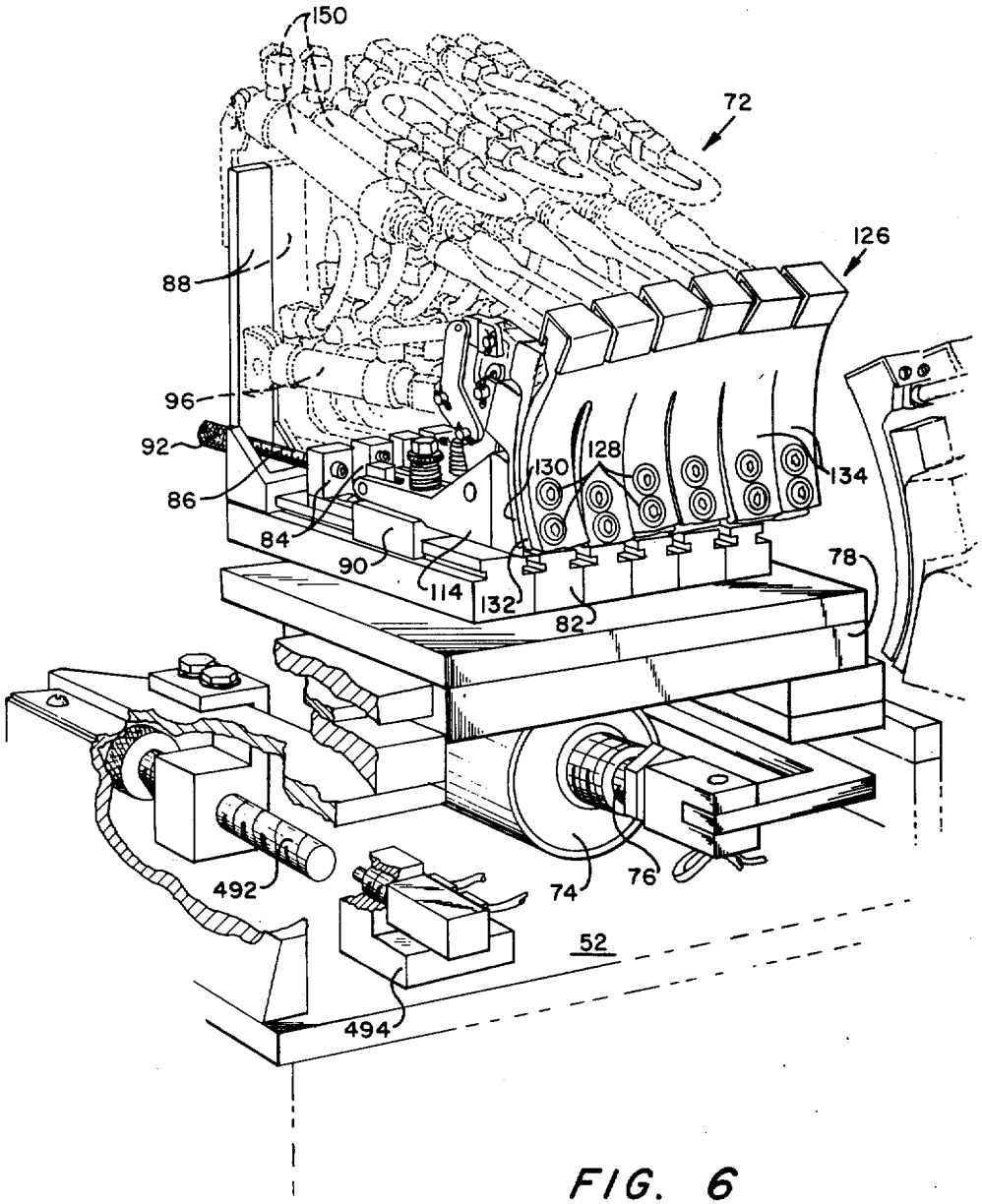
FIG. 6 is an isometric view of a side lasting unit.

Duplicate sets of lasting units 72 are located on opposite sides of the support 40 (see FIGS. 1 and 2). Referring to FIGS. 5 and 6, each set of lasting units 72 is mounted for inward-outward movement on a table 52. An air actuated motor 74, mounted to each table 52, has a piston rod 76 that is secured to a base 78 of a set of lasting units 72 to thereby enable the motors 74 to effect inward-outward movements of the sets of lasting units 72.

Figure 7:
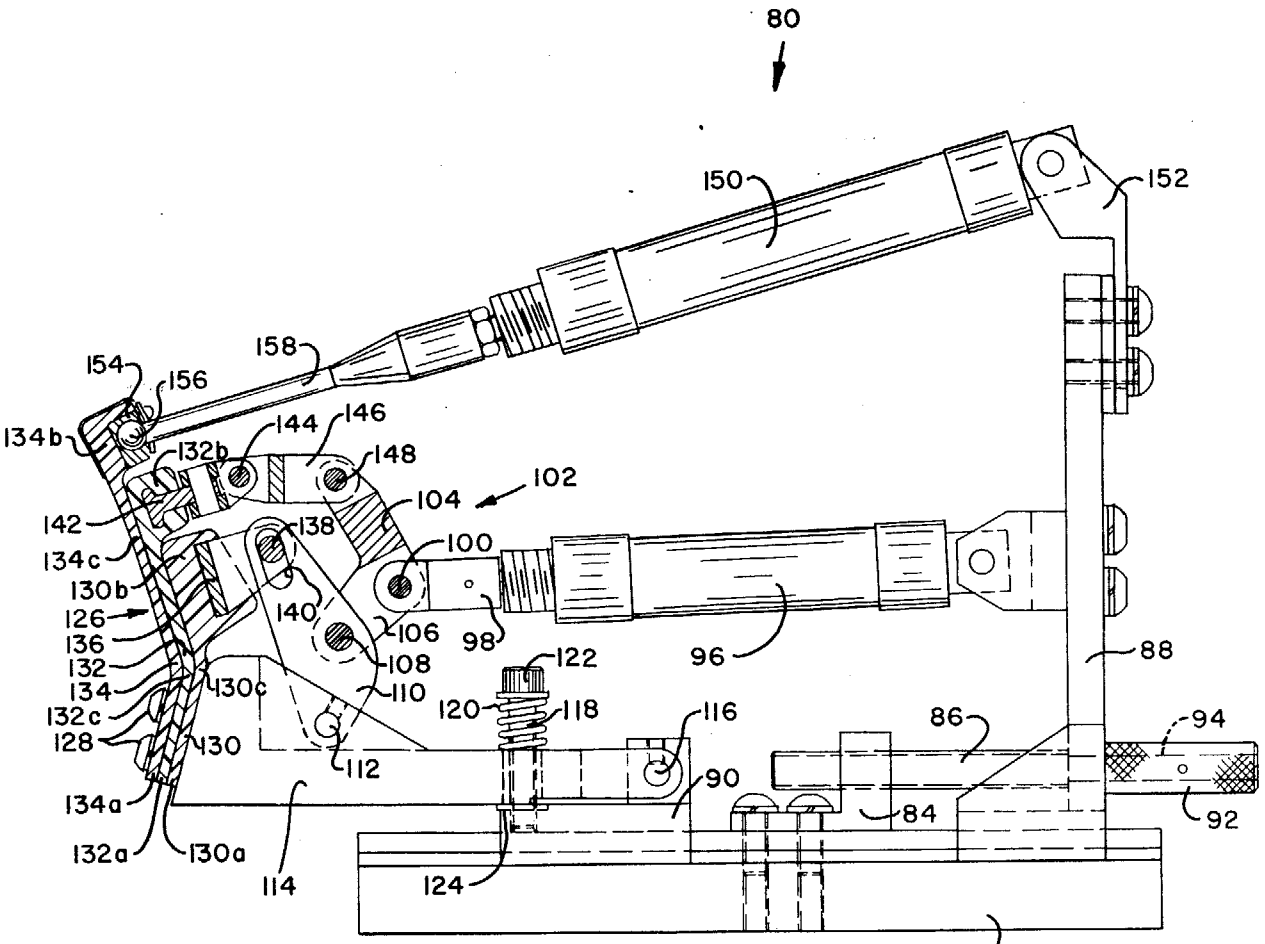
FIG. 7 is a partially sectional view of a side lasting instrumentality.

Referring to FIGS. 6 and 7, each set of lasting units 72 is formed of a plurality of lasting units 80 located side by side that are mounted to a support 82 that is secured to and is located above a base 78. A flange 84 for each lasting unit 80 is secured to and extends upwardly of a support 82 and threadedly receives a bolt 86. Each bolt 86 extends through an outer slide bracket 88, forming a part of a lasting unit 80, that is slidably mounted to a support 82 for inward-outward movement. Each lasting unit 80 includes an inner slide bracket 90 that is mounted to a support 82 for inward-outward movement. A knob 92 is pinned to the outer end 94 of each bolt 86, the outer ends 94 being of smaller diameter than the threaded portions of the bolts 86. The brackets 88 are located between the shoulders located at the juncture of the larger and smaller diametered portions of the bolts 86 and shoulders formed at the inner ends of the knobs 92. Due to the connection between the outer brackets 88 and the inner brackets 90, described below, rotation of the knobs 92 in one direction or the other will cause inward or outward movement of the brackets 88, 90 along the supports 82 and thus cause inward or outward movements of the lasting units 80.

An air operated motor 96 is pivoted to each outer bracket 88 and extends inwardly thereof. The piston rod 98 of each motor 96 is pivoted by a pin 100 to the middle of a lever 102. Each lever 102 has an upper limb 104 and a lower limb 106, the limbs extending inwardly of the pin 100. Each limb 106 is pivoted by a pin 108 to a lever 110. The bottom of each lever 110 is pivoted by a pin 112 to a block 114 for inward-outward movement about the axis of the pin 112. Each block 114 is pivoted for heightwise movement to an inner slide bracket 90 by a pin 116. A shaft 118, mounted to and upstanding from each bracket 90 inwardly of its associated pin 116, extends through its associated block 114. Compression springs 120 are entwined about the shafts 118 and extend between the tops of the blocks 114 and collars 122 mounted to the tops of the shafts 118. The springs 120 yieldably urge the blocks 114 downwardly about the axes of the pins 116 to positions wherein the bottoms of the blocks 114 engage collars 124 that are mounted to the shafts 118 beneath the blocks 114.

A lasting instrumentality 126 is anchored to each block 114 by bolts 128. Each lasting instrumentality 126 is formed of three plies, the outer ply being an outer presser strap 130, the middle ply being an inner presser strap 132, and the inner ply being a lasting strap 134. The straps 130, 132 and 134 are made of an elastic, flexible and deformable material such as urethane. The straps 130, 132 and 134 respectively have bottom segments 130a, 132a and 134a that are rigid by virtue of being secured to the block 114 by the bolts 128. The top of each lasting strap 134 is formed into a thickened relatively rigid top segment 134b. The middle segment 134c of the lasting strap 134, between the bottom segment 134a and the top segment 134b, is flexible, deformable and stretchable.

The top of each inner presser strap 132 is formed into a thickened relatively rigid top segment 132b that is located below its associated lasting strap top segment 134b. The middle segment 132c of the inner presser strap 132, between the bottom segment 132a and the top segment 132b, is flexible, deformable and stretchable.

The top of each outer presser strap 130 is formed into a thickened relatively rigid top segment 130b that is located below its associated inner presser strap top segment 132b. The middle segment 130c of the outer presser strap 130, between the bottom segment 130a and the top segment 130b is flexible, deformable and stretchable.

A lug 136, embedded in the outer presser strap top segment 130b, has a pin 138 mounted thereto that is slidably received into a slot 140 formed at the top of each lever 110.

A lug 142, embedded in the inner presser strap top segment 132b, is pivoted by a pin 144 to a link 146, and each link 146 is pivoted by a pin 148 to the top of its associated limb 104.

An air operated motor 150 is associated with each lasting instrumentality 126. Each motor 150 is pivoted to a bracket 152 that is secured to the top of each outer bracket 88. The motors 150 extend inwardly of the brackets 152. A socket 154 is embedded in each lasting strap top segment 134b. Each socket 154 rotatably receives a ball 156 that is mounted to the inner end of the piston rod 158 of its associated motor 150 to thereby provide a flexible connection between the piston rods 158 and the lasting strap top segments 134b.

Referring to FIGS. 8–16, a platform 160 is located rearwardly of the support 40 and the lasting units 72. A head 162 is mounted to and is located above the platform 160. A main slide plate 164 is slidably mounted in the head 162 for forward-rearward movement. A fluid actuated motor 166, mounted to the head 162 has a piston rod 168 connected to a bracket 170 mounted to the slide plate 164 to effect this movement. A heel clamp slide 172 is slidably mounted below the main slide plate 164 for forward-rearward movement in guideways 174 (FIGS. 14 and 15) mounted to the main slide plate. Mounted to the rear of the heel clamp slide 172 is a bracket 176 having a pair of laterally extending arms 178. An air actuated motor 180 is pivoted to each of the arms 178 on a pin 182. Each motor 180 has a piston rod 184 extending forwardly thereof. A pair of arms 186 are pivotally mounted to pins 188 which are secured to the forward end of the heel clamp slide 172. A shoulder 190 is provided on the heel clamp slide 172 rearwardly of the pins 188 to limit the extent that the arms 186 may pivot in a rearward direction. When at rest, the arms 186 are maintained in abutment against the shoulders 190 by means of tension springs 192 which are each connected at one end to an arm 178 and at its other end to a clip 194. The clips 194 are rigidly fastened to the outer extremities of the arms 186 by pins 196. A pair of sliding links 198, having longitudinal slots 200 formed at their midportions, are pivotally connected by means of pins 202 to angle brackets 204, the angle brackets 204 being rigidly fastened to the piston rods 184 of the motors 180. The links 198 are also movably connected to the arms 186 by means of engagement of the slots 200 and the pins 196 so that activation of the motors 180 to cause the piston rods 184 to move forwardly (to the left in FIG. 13) will cause the links 198 to have substantially linear forward movement, being guided by the pins 196. During the forward motion of the links 198, the pins 196, and consequently the arms 186, are rigidly maintained in a rearward position by means of the tension spring 192. Another link 206 is pivotally mounted at one end to each of the arms 186 by means of pins 208 which are secured to the arms 186 at their midportion. The other end of each link 206 is pivotally mounted to a pin 202 so that, as the motors 180 impart substantially forward motion to the links 198, rotary motion about the pins 208 will be simultaneously imparted to the links 206. A bolt 210 is threaded into each arm 186 in such a manner that it is in registry with the plane of rotation of the links 206 so that, as the links 206 rotate in response to actuation of the motors 180, they will abut the rearward ends of the bolts 210, thereby terminating the substantially forward linear motion of the links 198 and cause the arms 186, the links 198 and the links 206 to become rigid with respect to each other. When such a relatively rigid relationship occurs, further actuation of the motors 180 to cause further forward motion of the piston rods 184 will cause the arms 186, the links 198 and the links 206 to rotate, as rigid units, about the pins 188, overcoming the tension of the springs 192, with the motors 180 swinging about the axes of the pins 182.

Figure 10:
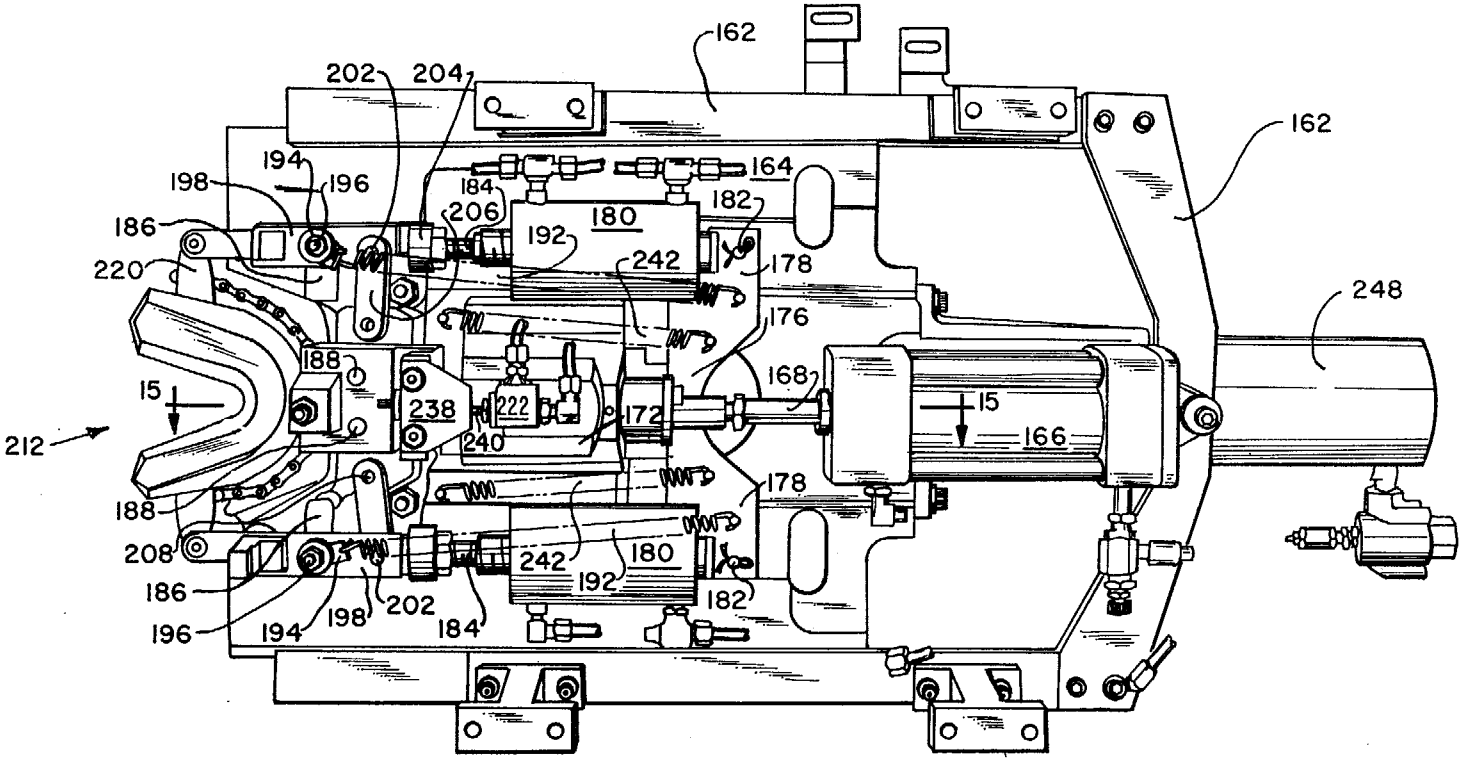
FIG. 10 is a bottom view of a heel lasting instrumentality in the machine.
Figure 13:
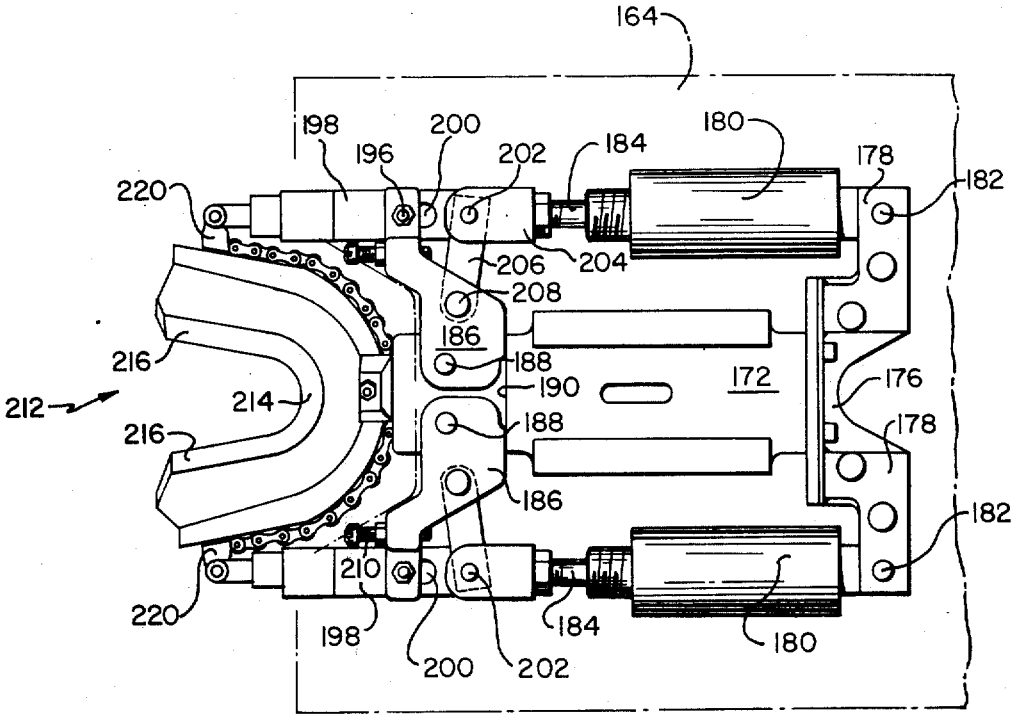
FIG. 13 is a plan view of a heel clamp operating mechanism.
Figure 14:
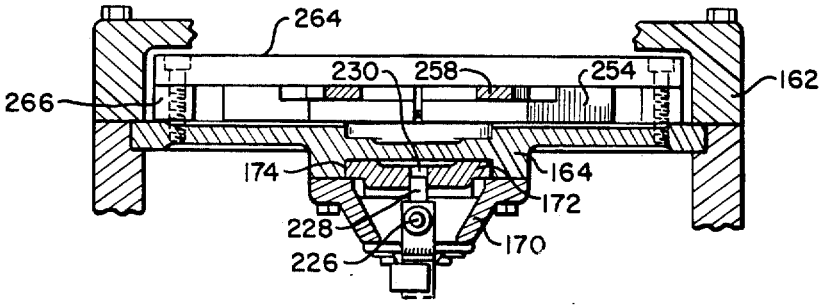
FIG. 14 is a view taken on the line 14—14 of FIG. 16.
Figure 15:
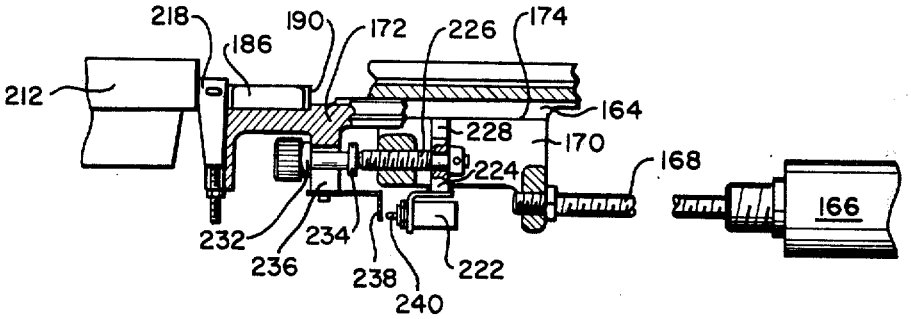
FIG. 15 is a view taken on the line 15—15 of FIG. 10.

As shown in FIGS. 10, 13 and 15, a substantially U-shaped heel clamp pad 212, having a bight 214 and a pair of legs 216 extending forwardly of the bight on opposite sides of the bight, is located forwardly of the heel clamp slide 172 between the links 198. The clamp pad 212 is formed from a yieldable material such as polyurethane. A positioning lug 218, extending rearwardly of the pad bight 214, is received in a slot formed in the forward end of the heel clamp slide 172. Lugs 220, that are mounted to and extend outwardly of the pad legs 216, are pivotally connected to the fronts of the links 198.

Referring to FIGS. 10 and 15, a pilot valve 222 depends from a bar 224. The bar 224 has a hole formed therein for rotatable accommodation of the rearward end of a shaft 226. The midportion of the shaft 226 is threaded into the forward end of the bracket 170 so as to be rigidly connected to and partake of the motion of the main slide plate 164. A finger 228 extends upwardly from and is made integral with the bar 224 and is contained in a longitudinal slot 230 (FIG. 14) formed in the heel clamp slide 172. Formed at the forward end of the shaft 226 are spaced collars 232 and 234. A depending leg 236, which is an integral part of the heel clamp slide 172, straddles the shaft 226 at a point intermediate the collars 232 and 234. It may thus be seen that the heel clamp slide 172 and all components mounted thereto may slide with respect to the main slide plate 164 a distance that is governed by the clearance between the depending leg 236 and the collars 232 and 234. A stop 238 is secured to the bottom of the depending leg 236 and extends rearwardly to be in alignment with the plunger 240 of the pilot valve 222. In the idle condition of the machine, the heel clamp slide 172 is maintained in a forward position relative to the main slide plate 164 with the depending leg 236 in abutment with the collar 232 by means of a pair of tension springs 242 (FIG. 10) that have one end connected to the bracket 170 and the other end connected to an arm 178 of the bracket 176 which is mounted to the rear of the heel clamp slide 172.

Referring to FIGS. 11, 12, 14 and 16, a wiper slide 244 is slidably mounted for forward and rearward movement in guideways 246 formed in the upper surface of the main slide plate 164. An air actuated motor 248 is mounted to a bracket 250 that is secured to and extends rearwardly of the main slide plate 164. The piston rod 252 of the motor 248 is connected to the wiper slide 244 so that activation of the motor 248 will cause the wiper slide 244 and all components carried thereon to move forwardly or rearwardly in the guideways 246. Slidably mounted to the upper surface of the forward end of the main slide plate 164 are a pair of wiper cams 254 to which are mounted heel wipers 256. A pair of links 258 pivotally connect the wiper slide 244 and the wiper cams 254 so that motion may be transmitted to the wiper cams 254 and consequently the wipers 256 upon actuation of the wiper slide 244 by the air motor 248. For the purpose of guiding the wiper cams 254 in a desirable predetermined path, rollers 260 are rotatably mounted to the main slide plate 164 and protrude upwardly into cam slots 262 formed in the wiper cams 254 for accommodation of the rollers 260. The wiper cams 254 are maintained in sliding contact with the main slide plate 164 by means of a cover 264 which is bolted to the main slide 164 and is spaced therefrom by means of spacers 266 (FIG. 14), the spacing between the main slide plate 164 and the cover 264 being such that the wiper cams 254 may have horizontal sliding motion only, there being insufficient clearance for allowance of any substantial vertical movement.

Figure 9:
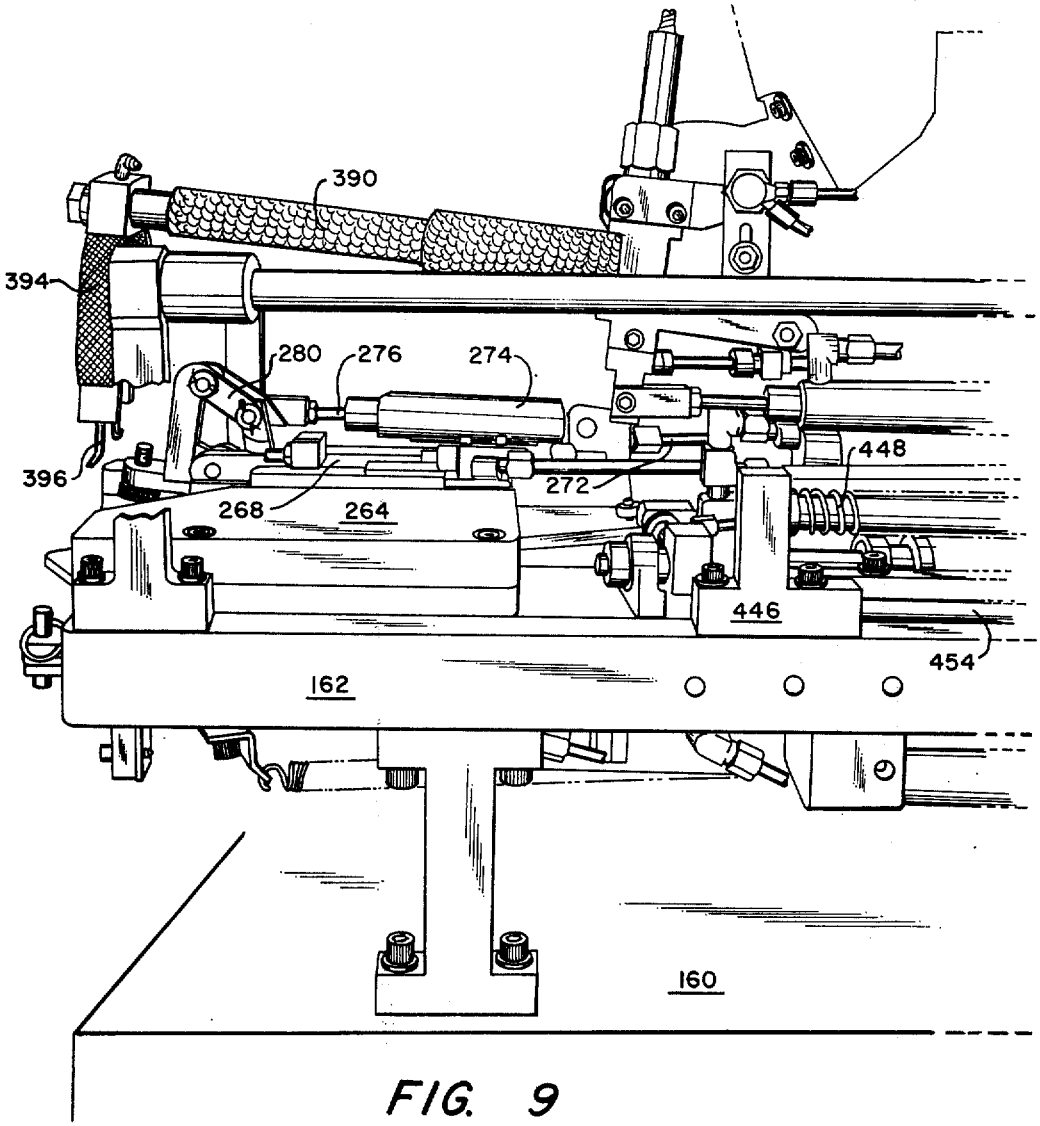
Figure 11:
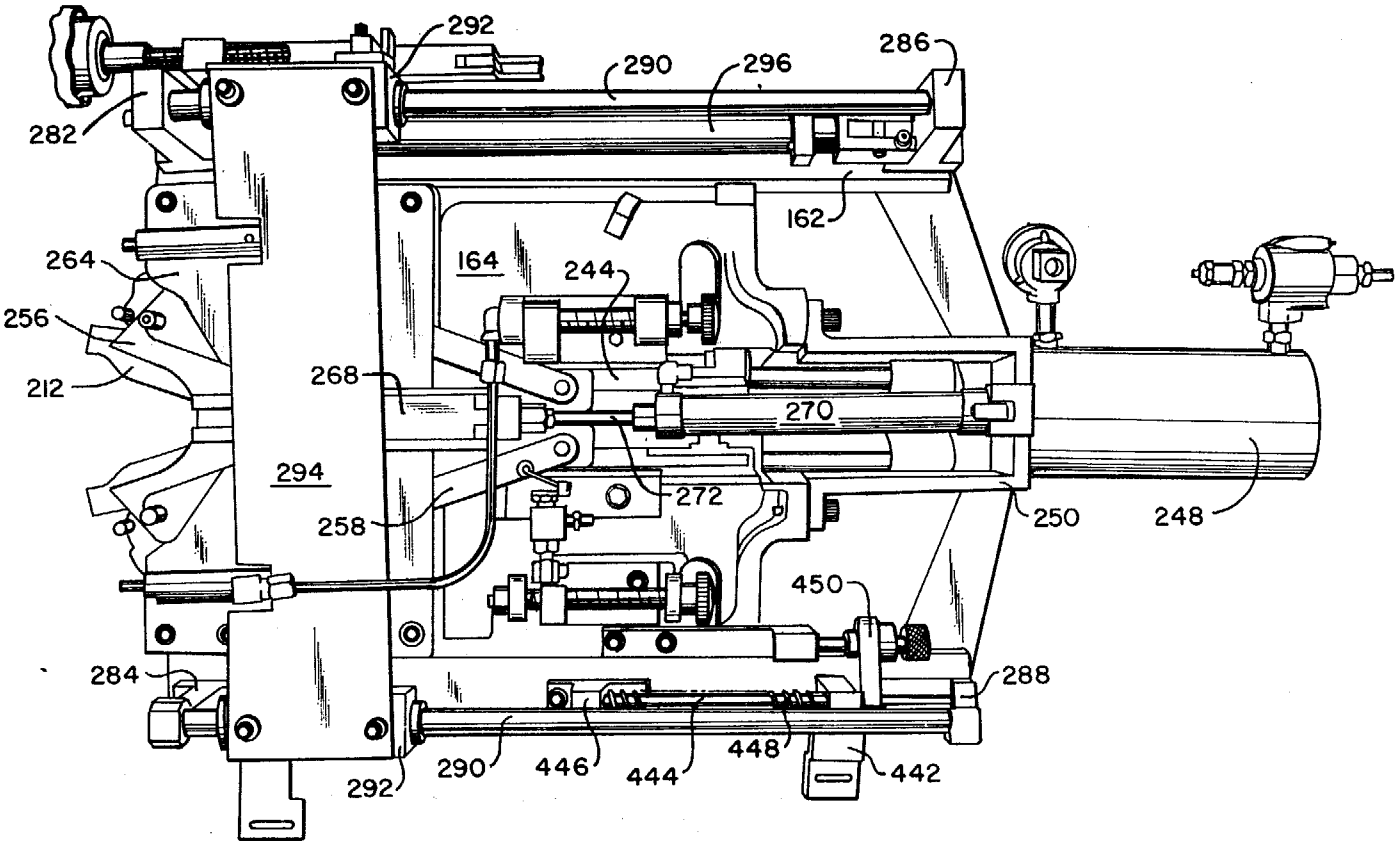
FIGS. 11 and 12 are top views of the heel lasting instrumentality.
Figure 12:
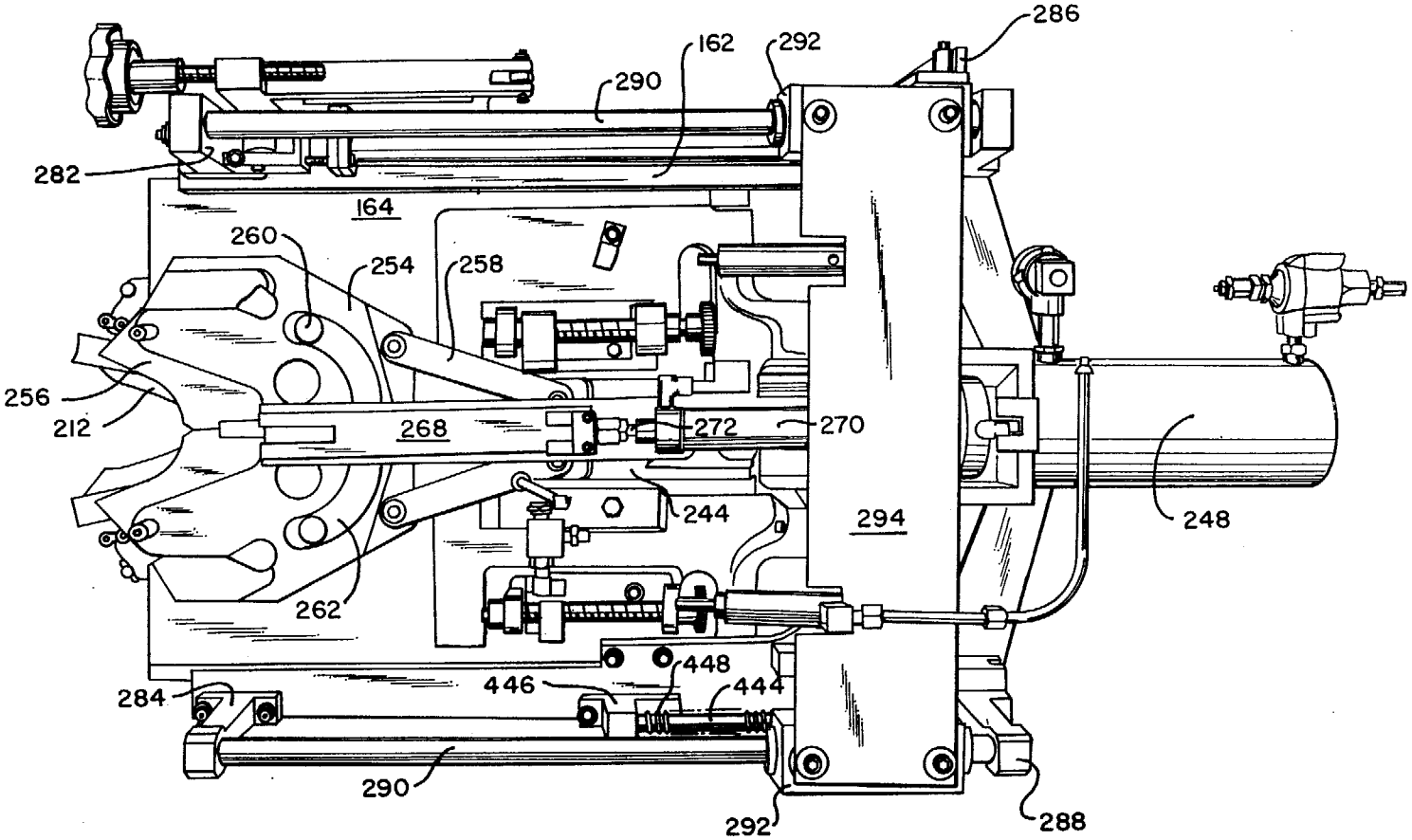

Referring to FIGS. 8, 9 and 11, a hold-down slide 268 is mounted to the top of the cover 264 for forward-rearward movement. An air actuated motor 270, mounted to the bracket 250, has a forwardly projecting piston rod 272 that is connected to the slide 268 so that the motor 270 may effect forward-rearward movement of the slide. An air actuated motor 274, mounted to the slide 268, has a forwardly directed piston rod 276. A hold-down 278 is mounted to the front of the slide 268 for heightwise movement and is so connected to the piston rod 276 by a linkage 280 as to enable forward and rearward movements of the piston rod 276 to respectively lower and raise the hold-down 278.

Referring to FIGS. 2, 8, 11, 12 and 17–19, a pair of front posts 282 and 284 and a pair of back posts 286 and 288 are upstanding from the head 162. The two front posts and the two back posts are located on opposite sides of the head 162 and a pair of slide rods 290 extend between the posts 282 and 286 and between the posts 284 and 288 so as to be located on opposite sides of the head 162 and so as to extend in forward-rearward directions. Bearing blocks 292 are slidably mounted on the slide rods 290 for forward-rearward movement and a slide plate 294 extends between the slide rods 290 and is secured to the bearing blocks 292.

An air actuated motor 295, comprising a cable cylinder 296, extends between the posts 282 and 286 and is mounted to blocks 298 and 300 that are respectively secured to the posts 282 and 286. Cables 302, forming parts of the motor 295, are secured to the opposite faces of a piston (not shown) that is slidably mounted in the cylinder 296. The cables 302 extend about pulleys 304 that are rotatably mounted in the blocks 298 and 300 and the ends of the cables remote from the piston in the cylinder 296 are anchored to a clip 306 that is mounted to a strap 308. The strap 308 is fastened to one of the bearing blocks 292. Thus, actuation of the motor 295 will move the clip 306 forwardly or rearwardly to thereby move the slide plate 294 and the parts carried forwardly or rearwardly.

Figure 17:
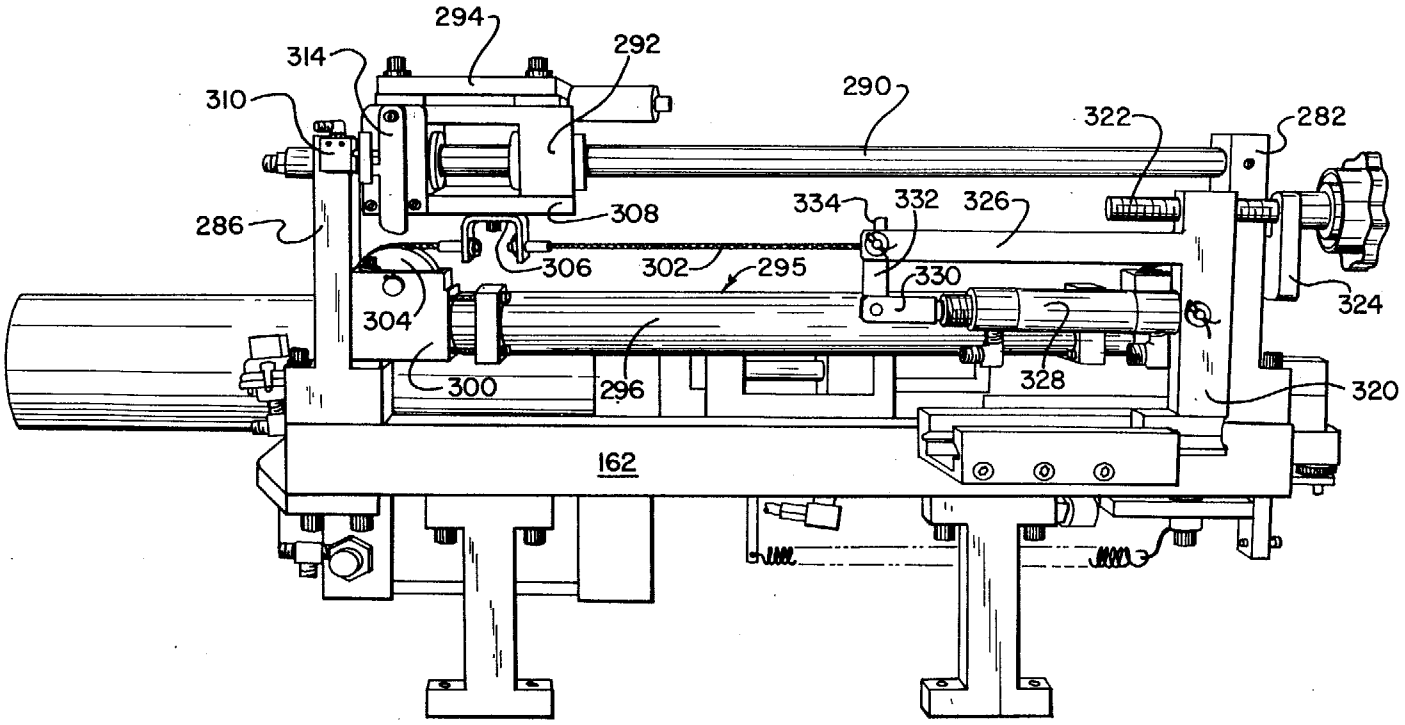
FIGS. 17, 18, 19 and 20 are side views of portions of the machine that cause movements of the nozzles.
Figure 18:
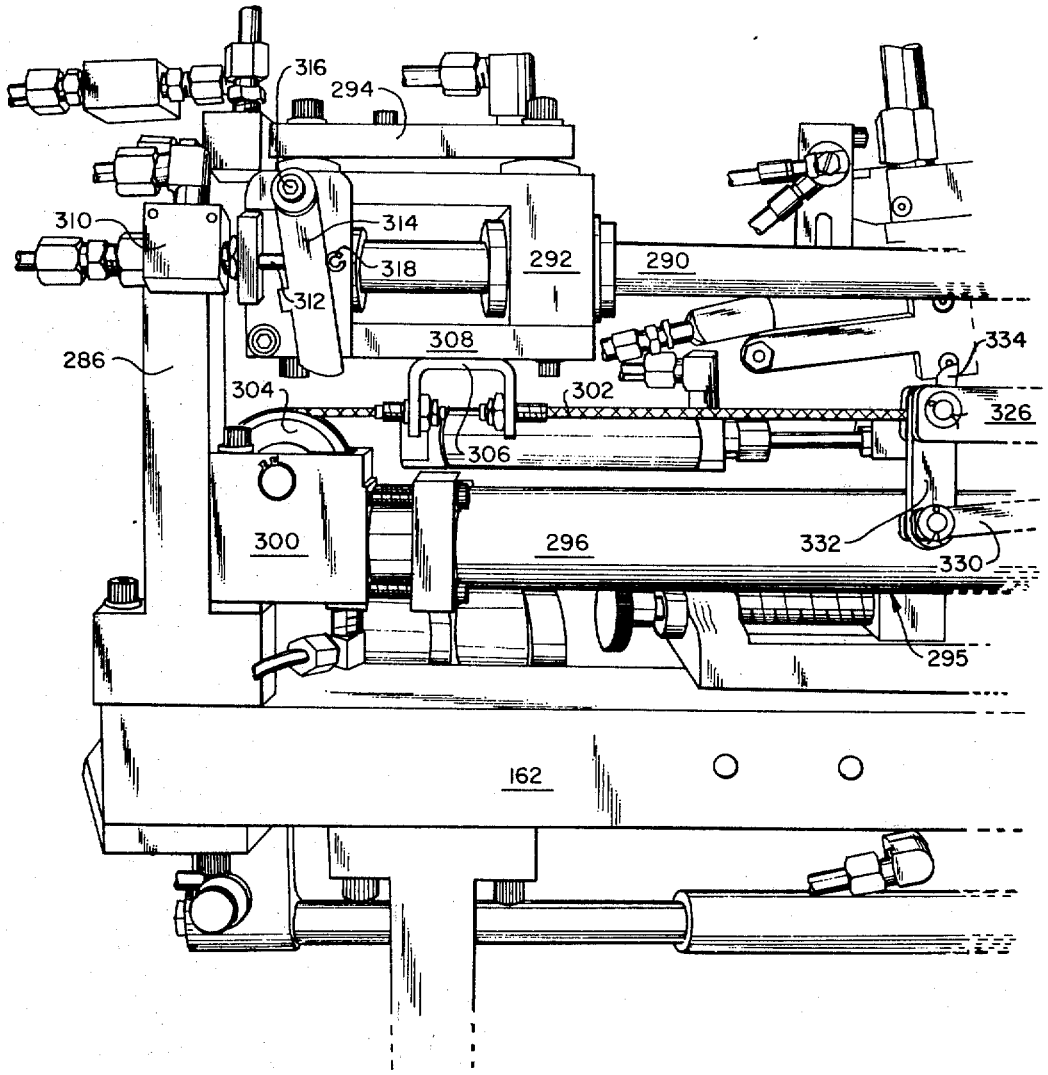
Figure 20:
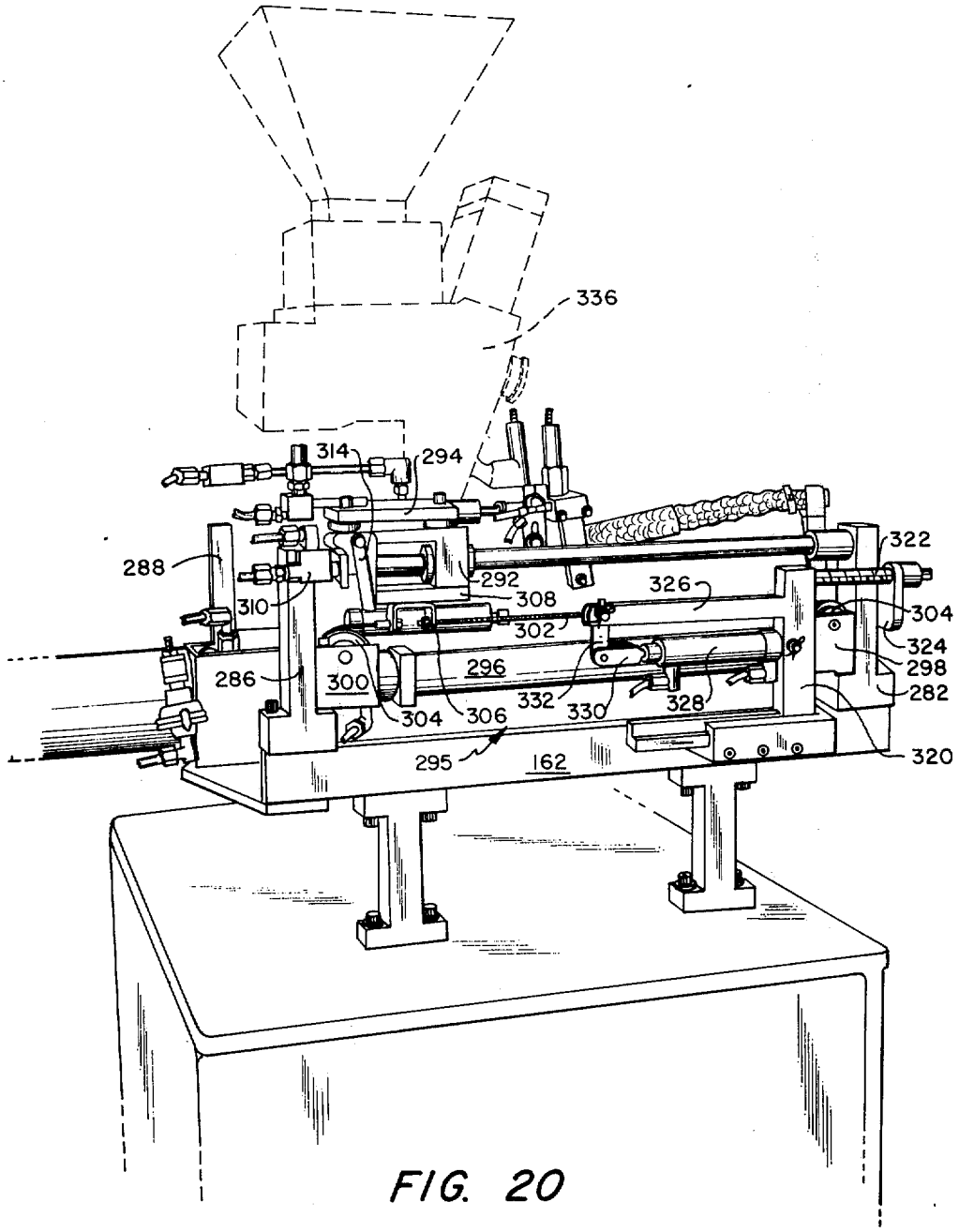

Referring to FIGS. 17, 18 and 20, a valve 310 mounted to the bearing block 292 that has the strap 308 fastened thereto has a forwardly directed valve stem 312 that is spring urged forwardly by the conventional spring in the valve 310 so as to urge the valve stem 312 against a valve actuating rod 314 that is pivoted to the bearing block 292 associated with the valve 310 for forward-rearward swinging movement about the axis of a pin 316. The valve stem 312 urges the rod 314 about the axis of the pin 316 to a position wherein the front of the rod 314 engages a stop pin 318 that projects from the associated bearing block 292.

As shown particularly in FIGS. 17 and 20, a column 320 is mounted in the machine adjacent the front post 282 for forward-rearward movement and can be adjusted in forward-rearward directions by a screw 322 that is threaded into the column 320 and is rotatable in a bracket 324 that is secured to the post 282. A support 326 extends rearwardly of this column. An air actuated motor 328 is pivoted to the column 320, and the piston rod 330 of the motor 328 extends rearwardly of this motor. The bottom of a bar 332 is pivoted to the back of the piston rod 330. The top of the bar 332 is so pivoted to the back of the support that a stop lug 334 on the topmost portion of the bar 332 extends above the support 326 in alignment with the front of the rod 314.

Figure 21:
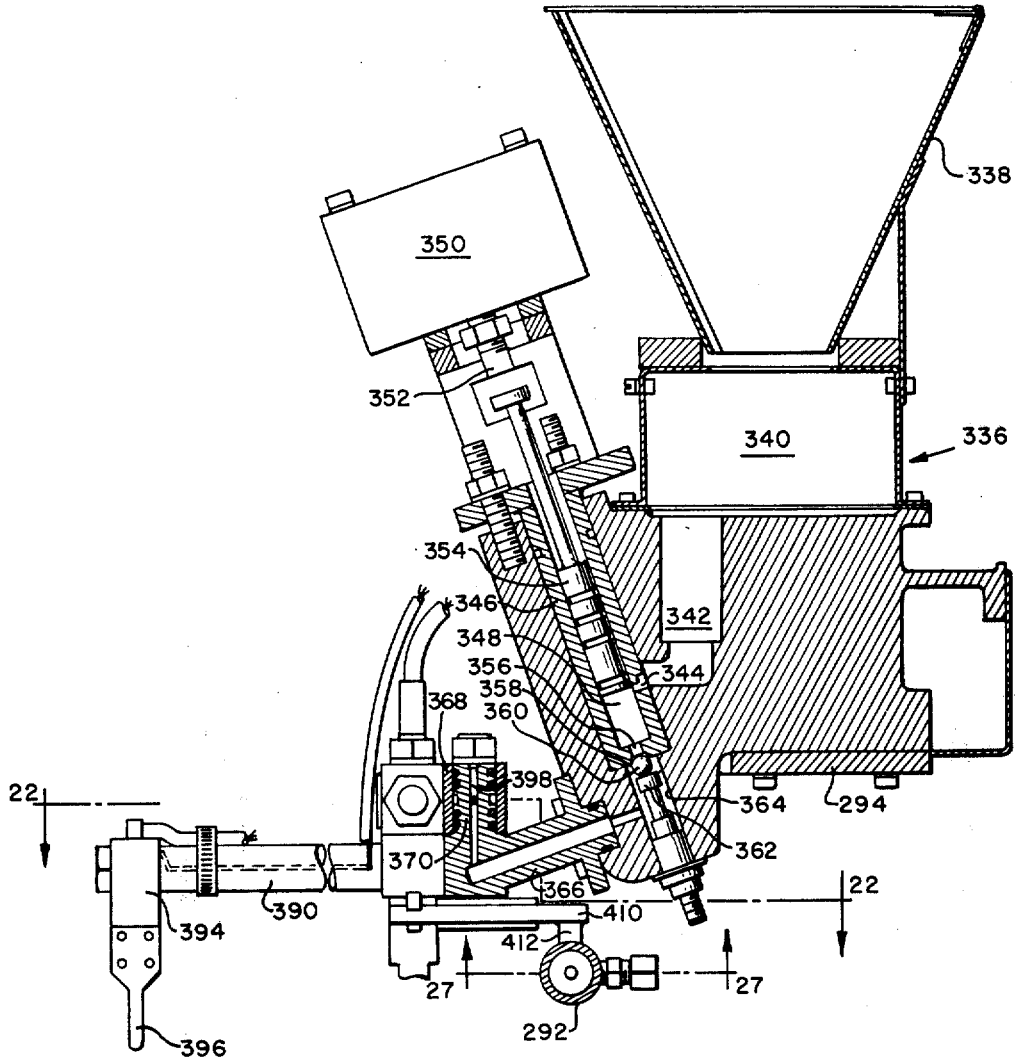
FIG. 21 is a sectional elevation of a cement applying mechanism taken along the line 21—21 of FIG. 23.

Referring to FIG. 21, a cement pot 336 is mounted to the slide plate 294 for forward-rearward movement therewith. The cement pot includes a funnel 338 into which solid granules of thermoplastic cement is supplied and a storage chamber 340 into which the solid cement gravitates from the funnel 338 and in which the cement is melted by heating means (not shown). The molten cement gravitates from the chamber 340 through a passage 342 and an orifice 344 in a hollow sleeve 346 into a bore 348 forming the hollow interior of the sleeve 346. The sleeve 346 is mounted to the cement pot 336. An air actuated motor 350, also mounted to the cement pot 336, has a downwardly depending piston rod 352 to which is attached a downwardly depending plunger 354 that is slidable in the bore 348. An orifice 356 in the bottom of the sleeve 346 has a valve seat 358 formed thereon that is cooperative with a ball valve 360 to close the orifice 356 in response to upward movement of the plunger 354. The ball valve normally rests on a support member 362 that is mounted to the cement pot 336 so that communication is provided between between the orifice 356 and a passage 364 located below the orifice 356.

Figure 22:
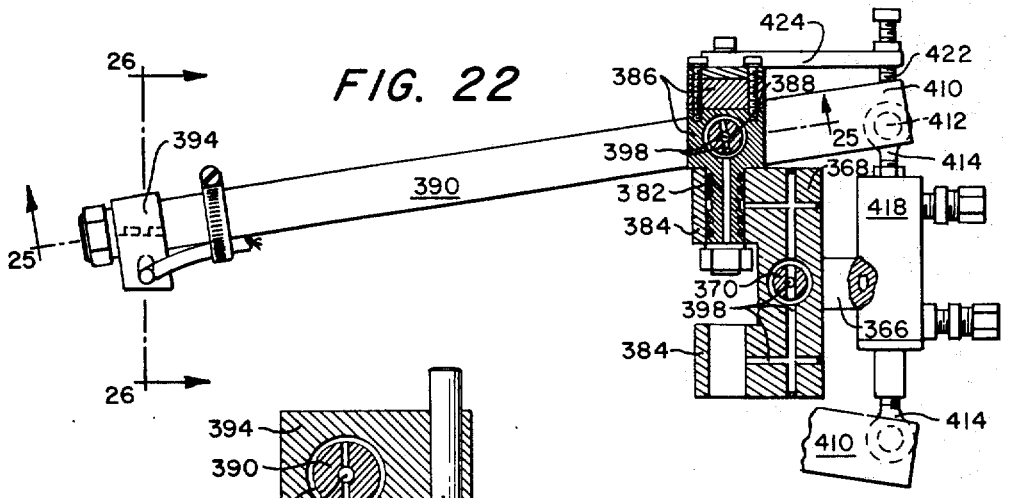
FIG. 22 is a partially sectional view taken along the line 22—22 of FIG. 21.
Figure 23:
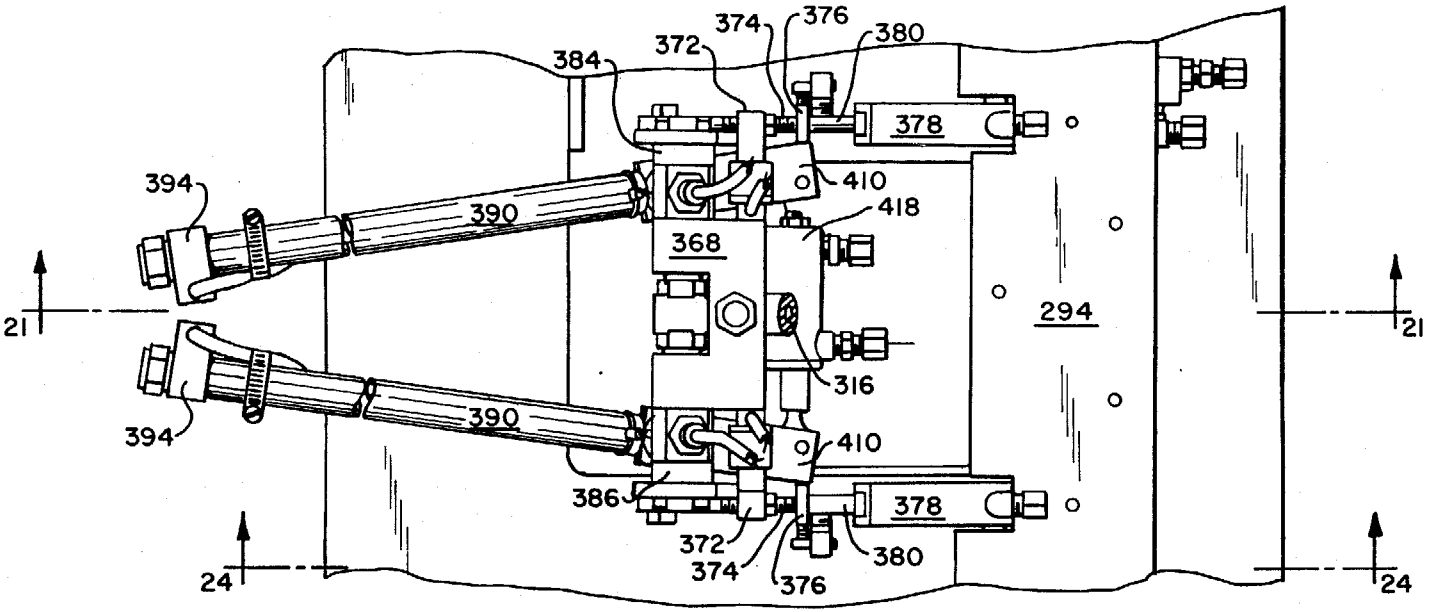
FIG. 23 is a plan view of the cement applying mechanism.
Figure 24:
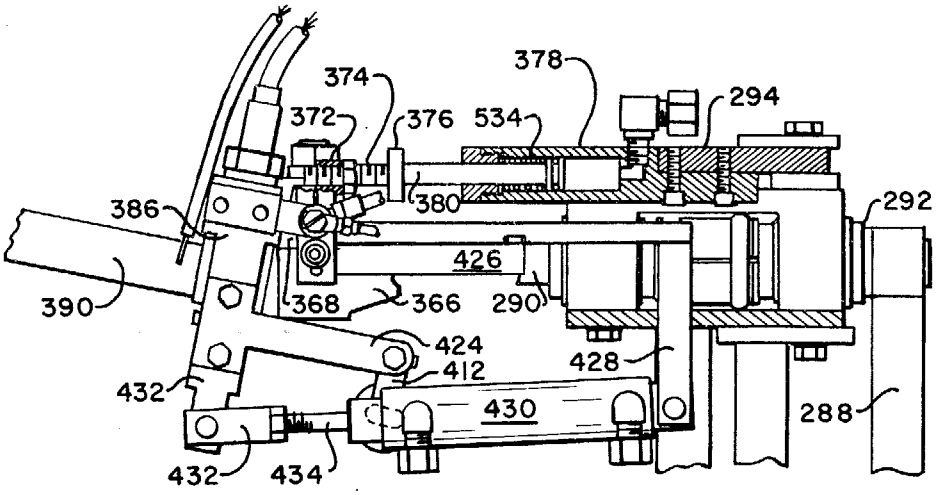
FIG. 24 is a view taken along the line 24—24 of FIG. 23.

Referring to FIGS. 21 and 22, a prong 366 is secured to and extends downwardly and forwardly of the cement pot 336. A block 368 is pivoted to a post 370 extending upwardly of the front of the prong 366 for swinging movement about the upright axis of the post 370. A projection 372 (FIG. 23) extends laterally of each side of the block 368 and a stabilizer bolt 374 is secured to each projection 372 with a head 376 of each bolt 374 extending rearwardly of its associated projection 372. As shown particularly in FIGS. 23 and 24, a pair of single acting spring return air operated motors 378 are so mounted to the slide plate 294 that their forwardly directed piston rods 380 are in alignment with the bolt heads 376.

Figure 26:
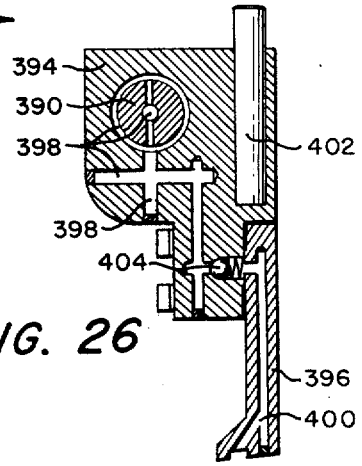
FIG. 26 is a section taken along the line 26—26 of FIG. 22.
Figure 25:
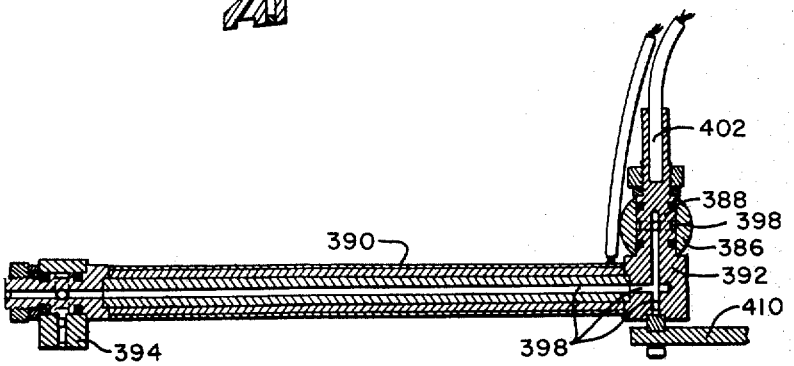
FIG. 25 is a view taken along the line 25—25 of FIG. 22.

A pair of aligned spindles 382 (FIG. 22) are mounted for swinging movement about a horizontal axis in projections 384 of the block 368, the spindles having extensions 386 that extend outwardly of the block 368. A heightwise extending spindle 388 (see FIGS. 22 and 25) is swingably mounted in each spindle extension 386 and a nozzle carrier 390 is mounted to an extension 392 of the spindle 388 so as to extend forwardly thereof. A nozzle holder 394 is mounted to the front of each nozzle carrier 390 and a nozzle 396 (FIG. 26) is mounted to and depends downwardly of each nozzle holder 394.

Interconnected passage means 398 in the cement pot 336, the prong 366, the block 368, the post 370, the spindles 382, the spindle extensions 386, the spindles 388, the nozzle carriers 390, the nozzle holders 394 and the nozzles 396 provide communication for the molten cement between the passage 364 and passages 400 (FIG. 26) located in each of the nozzles 396. Strategically located electric cartridge heaters, such as the heaters 402 shown in FIGS. 25 and 26 serve to maintain the cement that is in the passage means 398 and the passages 400 molten. A check valve 404 (FIG. 26) in each nozzle holder 394 yieldably blocks the flow of cement through the passage means 398.

Figure 27:
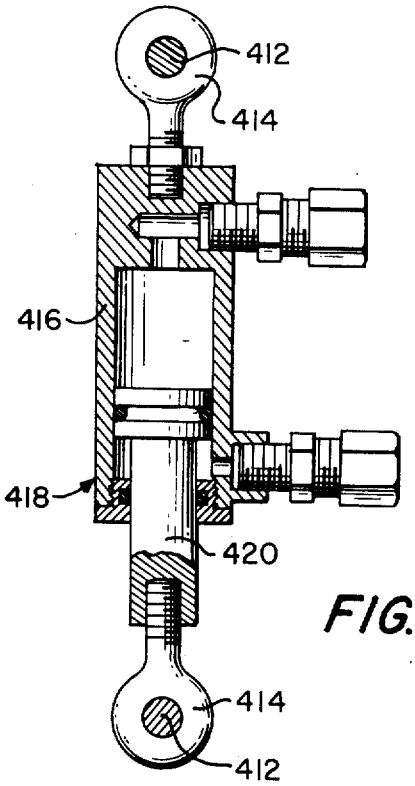
FIG. 27 is a section taken along the line 27—27 of FIG. 21.
Figure 29:
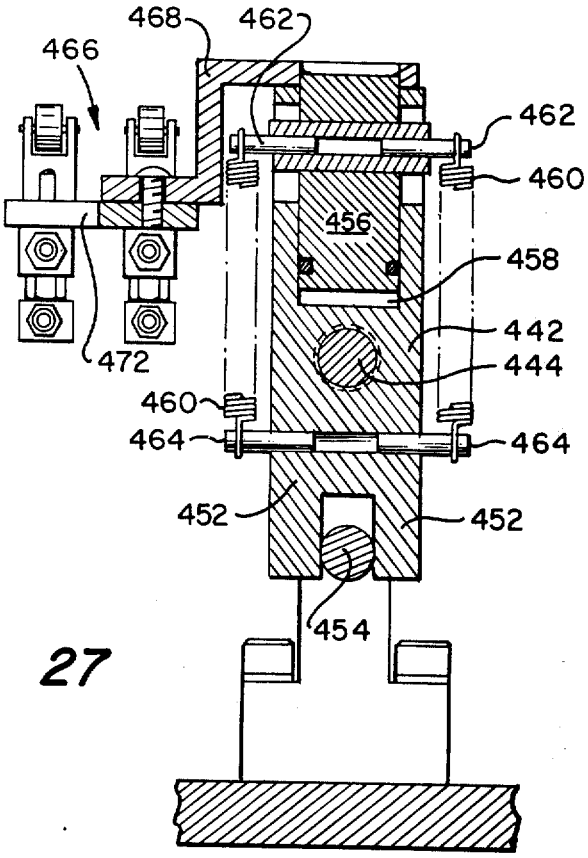
FIG. 29 is a section taken along the line 29—29 of FIG. 8.

Each spindle extension 392 has a bar 410 (FIGS. 21, 22 and 25) extending rearwardly thereof that has a bar 412 depending from its back end. Each bar 412 is mounted to a yoke 414. One of the yokes 414 is secured to the cylinder 416 (FIG. 27) of an air operated motor 418 and the other yoke 414 is secured to the piston rod 420 of this motor. As described below, the operation of the motor 418 serves to swing the nozzle carriers 390 and the bars 410 about the axes of the spindles 388. The extent of outward movement of the bars 410 and the extent of inward movement of the nozzle carriers 390 is determined by the engagement of the bars 410 with stop bolts 422 that are located outwardly of the bars 410 and are mounted to bars 424 that in turn are secured to their associated block extensions 386.

A rod 426 (FIG. 24) attached to and extending rearwardly of each projection 372 of the block 368 has a post 428 depending from its back, and an air operated motor 430 is pivoted to the bottom of each post 428. A lug 432, depending downwardly of and connected to each spindle extension 386, is pivoted to a clevis 432 that is secured to the piston rod 434 of its associated motor 430, the piston rods 434 projecting forwardly of the motors 430.

Figure 19:
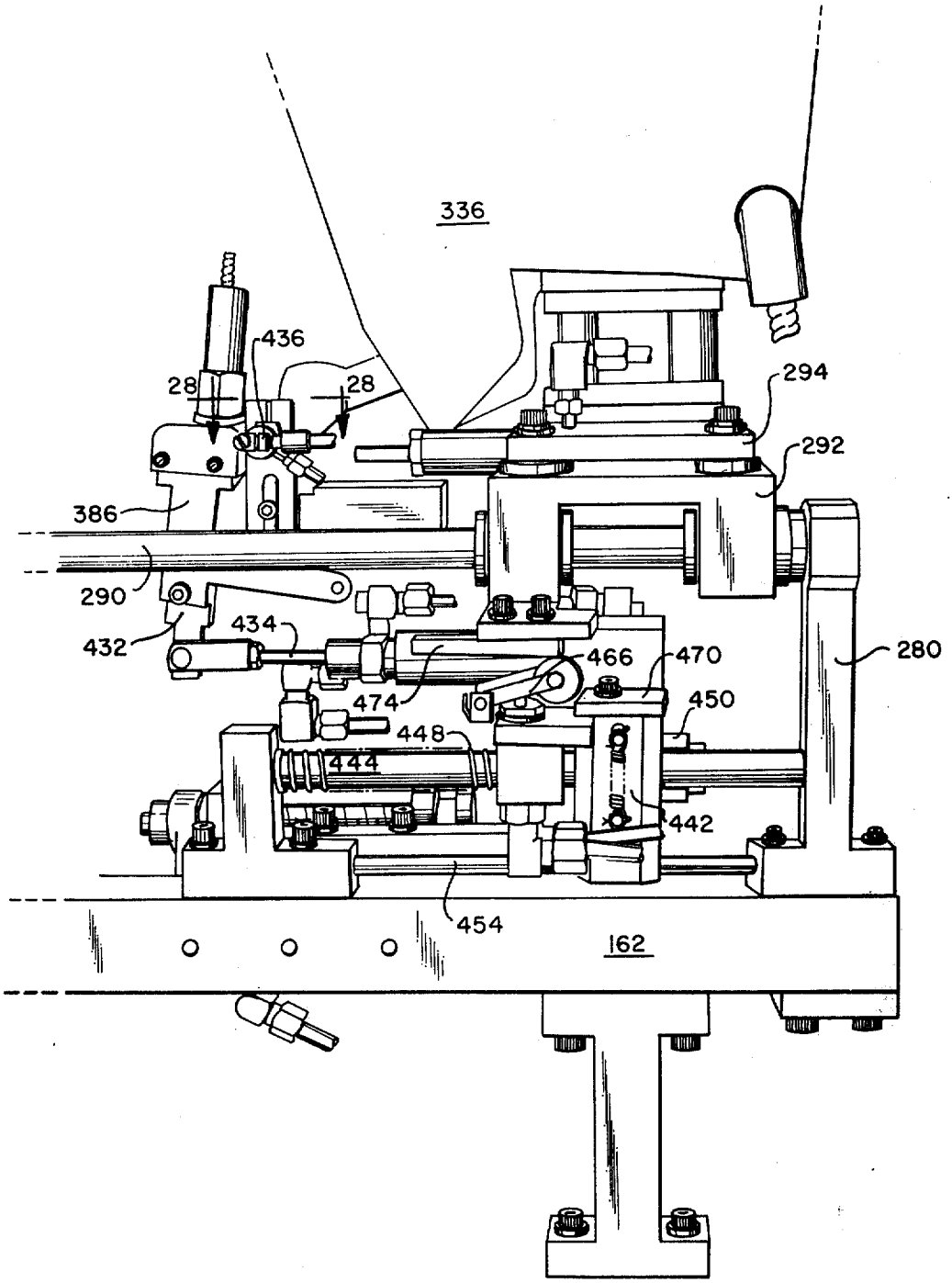
Figure 28:
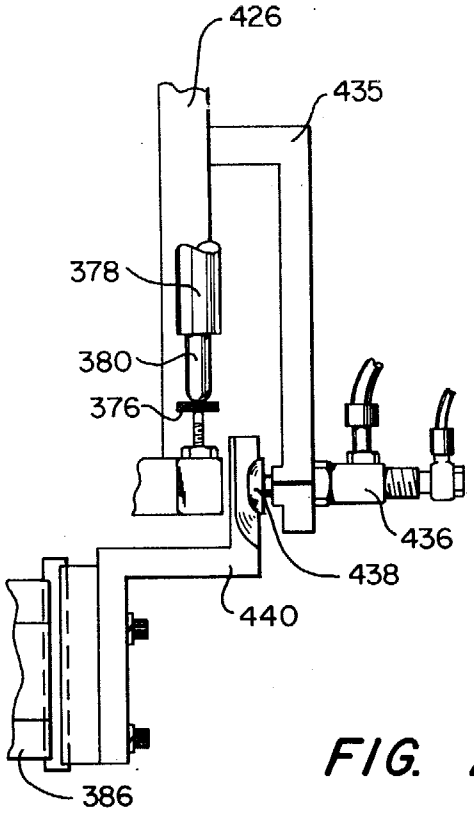
FIG. 28 is a view taken along the line 28—28 of FIG. 19.

Referring to FIGS. 19 and 28, a bracket 435 is secured to each rod 426 and a valve 436 is so mounted to each bracket 435 as to have its valve actuator 438 extend inwardly of its associated bracket 435. The valve actuators 430 are resiliently urged inwardly by the conventional springs incorporated in the valves 436. A cam 440 is so mounted to each spindle extension 386 as to be in intersecting relationship with its associated valve actuator 438.

Referring to FIGS. 8, 9, 11, 12, 19 and 29, a block 442 is slidably mounted for forward-rearward movement on a shaft 444. The shaft 444 is fixed to and extends between the back post 288 and a pillar 446 that is mounted to the head 162. A compression spring 448, entwined about the shaft 444 between the block 442 and the pillar 446, acts to yieldably urge the block 442 rearwardly along the shaft 444. A lug 450 is rigidly mounted to the slide plate 164 and is movably mounted on the shaft 444 rearwardly of the block 442 so as to be engaged by the back of the block 442 and thus limit the extent of rearward movement of the block 442 under the influence of the spring 448. Depending lugs 452 on the block 442 straddle a rod 454 that is located below the shaft 444 and is secured to the post 288 and the pillar 446. An air operated cylinder 456 is mounted for heightwise movement in a cavity 458 in the block 442 and is resiliently urged downwardly of the block by tension springs 460 that extend between pins 462 anchored to the cylinder 456 and pins 464 anchored to the block 442. The bottom of the cavity 458 is in communication with a source of pressurized air. A valve assembly 466 is mounted to a flange 468 that is secured to the top of the cylinder 456. The valve assembly 466 is offset outwardly of the cylinder 456. The flange 468, which forms a stop member, includes a forwardly facing stop surface 470 (FIG. 8) that is approximately at the level of the top of the cylinder 456, and a lower surface 472 to which the valve assembly is mounted. A cam 474 is mounted to the bearing block 292 associated with the back post 288. The cam 474, as described below, is in alignment with the stop surface 470 and the valve assembly 466 when the cylinder 456 has been raised to an upper position.

Figure 16:
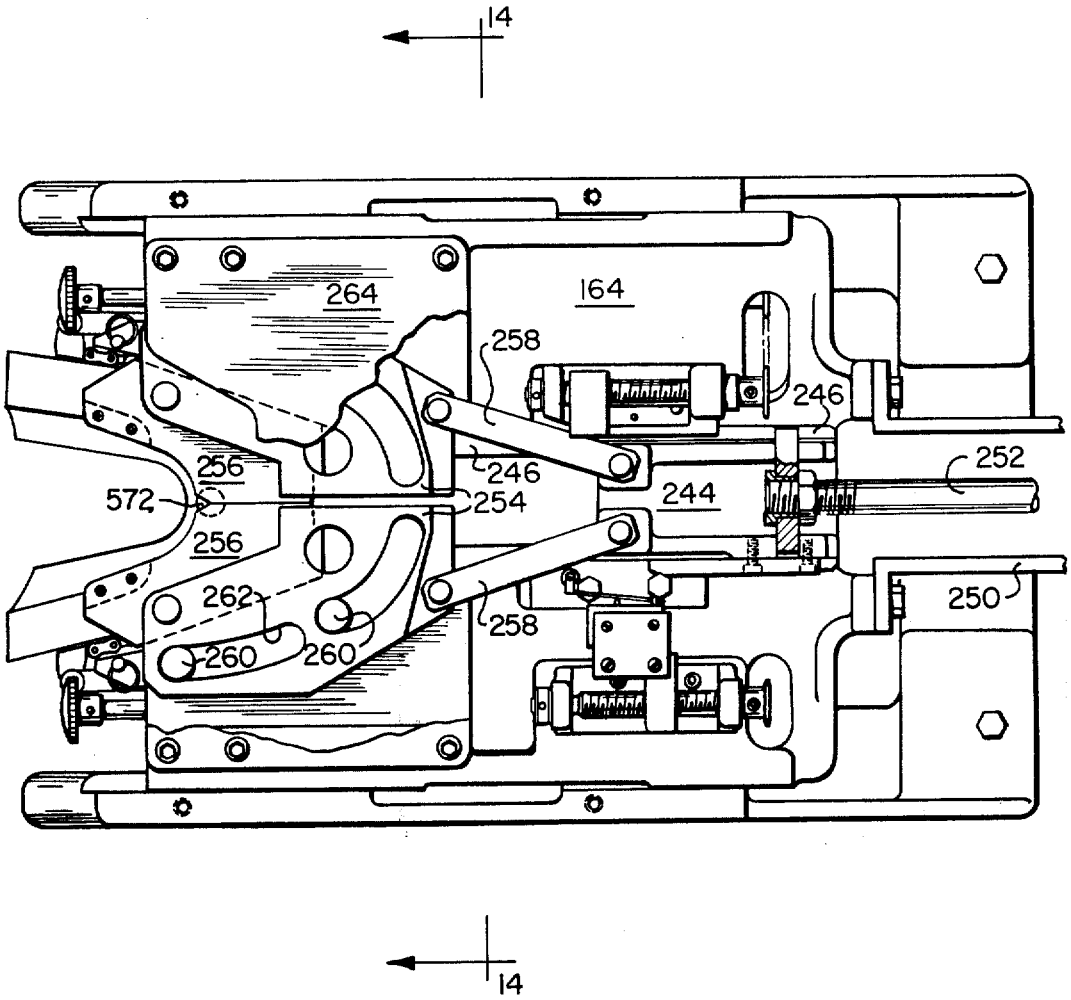
FIG. 16 is a plan view of a heel wiper operating mechanism.

In the idle condition of the machine: the piston rod 18 is retracted into the motor 16 to maintain the support 40 in a lowered position; the piston rod 34 is retracted into the cylinder 32 of the motor 30 to thereby maintain the brake fingers 36 disengaged from the flange 38; the piston rods 76 are retracted into the motors 74 to thus force the bases 78 into outer positions and thus position the sets of lasting units 72 in outer positions wherein they do not interfere with the placement of a shoe assembly on the support 40 as described below; the piston rods 98 are retracted into the motors 96 and the piston rods 158 are retracted into the motors 150 thus placing the lasting instrumentalties 126 in outer positions on the supports 82; the piston rod 168 is retracted into the motor 166 to maintain the main slide plate 164 and the parts carried thereby in a rearward position; the piston rods 184 are retracted into the motors 180 to maintain the heel clamp pad 212 in an open position; the piston rod 252 is retracted into the motor 248 to thereby maintain the wipers 256 in the retracted position shown in FIG. 16; the piston rod 272 is retracted into the motor 270 to maintain the hold-down 278 in a rearward position; the piston rod 276 is retracted into the motor 274 to maintain the hold-down 278 in an upper position; the motor 295 is so actuated as to cause the cables 302 to locate the slide plate 294 and the parts carried thereby, including the cement nozzles 396, in a rearward position with the cam 474 located rearwardly of the valve assembly 466 and the flange 468; the piston rod 330 is retracted into the motor 328 so that the stop lug 334 is in alignment with the rod 324; the piston rod 352 is retracted into the motor 350 so that the bottom of the plunger 354 is above the orifice 344; the piston rods 380 are projecting out of the motors 378 under relatively low pressure and bar against the bolt heads 374 so that the block 368, together with the nozzles 396, is restrained against movement about the upright axis of the post 370; the cylinder 416 and the piston rod 420 of the motor 418 are extended away from each other so that the nozzles 396 are swung above the axes of the spindles 388 to positions that are relatively close to each other in positions determined by the engagement of the bars 410 with the stop bolts 422; the piston rods 434 are projected out of the motors 430 to thereby move the nozzles 396 about the axis of the spindles 382 to raised positions; and the cylinder 456 is retained in a lowered position in the block 442 by the springs 460 to thereby lower the stop surface 470 and the valve assembly 466 out of intersecting relation with respect to the cam 474.

Thermoplastic cement is placed in the funnel 338 of the cement pot 336 and gravitates into the chamber 340 wherein it is melted. The molten cement flows from the chamber 340 through the passage 342, the orifice 344, the passage 364, and the passage means 398 up to the valves 404 in the nozzle holders 394.

Figure 31A:
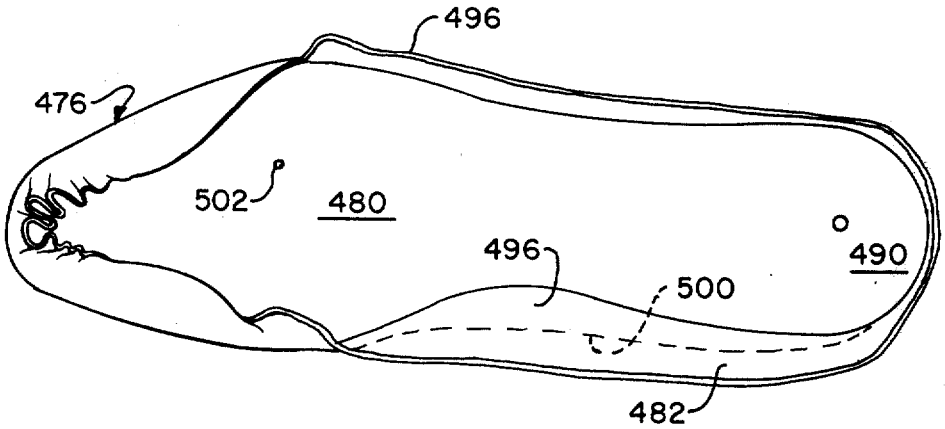
FIG. 31A is a view taken along the line 31A—31A of FIG. 31.
Figure 31:
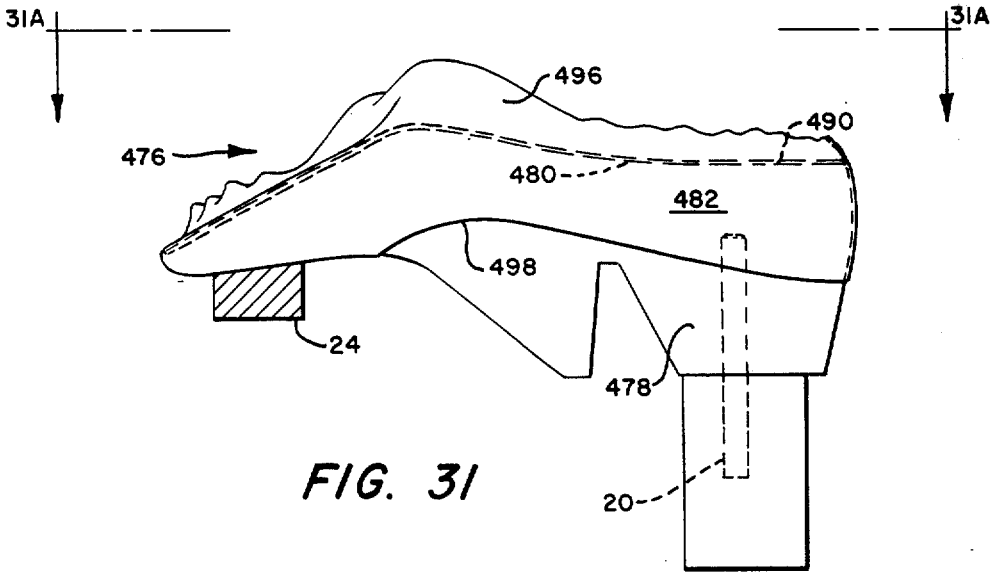
FIG. 31 is a side view of the shoe assembly as it is supported in the machine at the beginning of a machine cycle.

A shoe assembly 476 (FIGS. 31 and 31A) comprising a last 478 having an insole 480 located on its bottom and an upper 482 mounted thereon is placed bottom-up on the support 40 with the vamp of the shoe assembly resting on the toe rest 24 and with the last pin 20 inserted into the thimble in the back portion of the last so that the toe of the shoe assembly faces forwardly. Prior to placement in the machine, the shoe assembly 476 had been toe lasted. In FIGS. 31 and 31A the shoe assembly 476 is illustrated as being for a left foot and the machine operating cycle described below will be for a left foot shoe assembly.

The machine includes a left and a right control knob 484 (FIG. 1), each of which is mounted to a post 486 at the front of the machine. To start the machine cycle, the left control knob 484, as seen in FIG. 1, is momentarily depressed. By means shown in the aforementioned application Ser. No. 386,129, the column 22 and the toe rest 24 are so mounted to the sleeve 10 that they can swing leftwardly or rightwardly with respect to the sleeve 10 about an upright axis. The depression of the left control knob 484 actuates an air operated motor 488 (FIG. 3) to swing the column 22 and the toe rest 24 rightwardly (FIG. 1).

The depression of the left control knob 484 also admits air under relatively high pressure to the blind end of the left motor 378 as seen in FIG. 1 (the top motor 378 in FIG. 23) to thus project the piston rod 380 of this motor 378 forwardly under a pressure that is higher than the pressure projecting the piston rod 380 of the other motor 378 forwardly. As a result, the block 368 is swung counter clockwise (FIG. 23) about the axis of the post 370 so as to swing the nozzles 396 rightwardly as seen from the [ part ] *front* of the machine (downwardly in FIG. 23).

The depression of the left control knob 484 also actuates the motor 270 to project the piston rod 272 forwardly to thus move the hold-down slide 268 forwardly, thereby moving the hold-down 278 forwardly over the bottom of the shoe assembly 476. This is followed by an actuation of the motor 274 to project its piston rod 276 forwardly to thus lower the hold-down 278 to a position wherein its bottom is at substantially the same elevation as the plane of the bottom of the heel wipers 256. After this, the motor 16 is actuated under relatively low pressure to project its piston rod 18 upwardly to thereby raise the support 40 until the heel seat portion 490 (FIG. 31A) of the insole bears against the bottom of the hold-down 278 to thus locate the insole heel seat portion 490 in a plane substantially level with the plane of the bottoms of the heel wipers 256 in a plane parallel to the plane of movement of the heel wipers 256. After this, the motor 30 is actuated to move the cylinder 32 and the piston rod 34 away from each other to thereby force the brake fingers 36 against the flange 38 so as to lock the support 40 in working position in the machine in the position it had assumed pursuant to the rise of the support 40 by the motor 16 to bring insole heel seat portion 490 against the bottom of the hold-down 278. This is followed by an actuation of the motor 274 to raise the hold-down 278 to its idle position and an actuation of the motor 270 to return the hold-down slide 268 to its idle position.

After the hold-down slide 268 has returned to its idle position, the motor 166 is activated to move the main slide plate 164 to a forward working position and thereby carry the heel clamp pad 212 and the heel wipers 256 forwardly from their out-of-the-way positions until the bight 214 of the heel clamp pad 212 abuts the heel end of the shoe assembly 476, thereby terminating forward motion of the heel clamp pad 212. The main slide plate 164 and the heel wipers 256 carried thereon continue to move forwardly until the collar 234 (FIG. 15) on the shaft 226 abuts the depending leg 236 of the heel clamp slide 172. Simultaneously with the abutment of the collar 234 and the depending leg 236, the plunger 240 of the pilot valve 222 is depressed by reason of its abutment with the stop 238 to thereby actuate the pilot valve 222. The actuation of the pilot valve 222, by means of a control arrangement shown in U.S. Pat. No. 3,436,779, serves to lock the piston rod 168 of the motor 166 in position to thereby lock the main slide plate 164 in its forward position and also causes actuation of the motors 180.

The actuation of the motors 180 causes the heel clamp driving mechanism shown in FIGS. 10 and 13 to operate in the manner described above to move the heel clamp pad 212 to the FIG. 32 position. The legs 216 of the head clamp pad 212 are initially stretched forwardly towards the toe of the shoe assembly and are subsequently swung inwardly until they engage the side walls of the shoe assembly in the regions of the breast lines, so that all of the inner wall of the pad 212 engages the heel of the shoe assembly.

Figure 33:
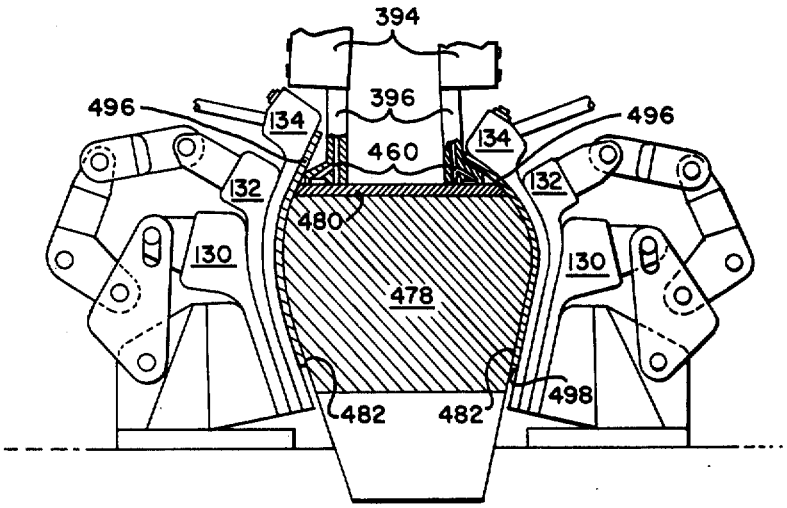
FIG. 33 is a view showing the nozzles as they appear when applying cement into the corners between the side portions of the upper margin and the corresponding portions of the insole periphery.

After the hold-down slide 268 has been returned to its idle position as described above, the momentary depression of the left control knob 484 causes the motors 74 to be so actuated as to project their piston rods 76 inwardly to thus move the bases 78, together with the sets of lasting units 72, inwardly to positions wherein bolts 492 (FIG. 6) mounted on the bases 78 engage flanges 494 mounted to the tables 52. As a result, the lasting instrumentalities 126 are positioned close to but not in engagement with the shoe assembly. This is followed by an operation of the motors 96 so as to admit pressurized air under relatively high pressure to the blind ends of these motors to thereby enable each piston rod 98 to cause a lasting intrumentality 126 to move inwardly with respect to its support 82 with its inner bracket 90 sliding on the support until the lasting strap bottom segment 134a engages and meets resistance from the shoe assembly 476. At this time, since there is no pressurized air in the motors 150, the piston rods 158 are dragged inwardly of the motors 150 during the inward movements of the lasting instrumentalities 126. The lasting strap bottom segments 134a engage the side portions of the shoe assembly 476, between its toe and heel portions, wherein the margin 496 of the upper 482 extends away from the insole as shown in FIG. 33. The rigid bottom segment 134a straddles the top line 498 of the upper so as to clamp the top line against the last 478. Upon engagement of a bottom segment 134a with the shoe assembly 476, the continued force applied by the piston rod 98, through the lever limb 106, causes the lever 110 to swing inwardly about its pivot pin 112. The inward swinging of the lever 110, through the pin and the slot connection 138 and 140, causes the outer presser strap top segement 130b to be forced inwardly thus flexing inwardly the outer presser strap middle segment 130c. This is followed by an inward swinging of the lever 102 about its pivot pin 108 which, through the lever limb 104 and the link 146, causes the inner presser strap top segment 132b to be forced inwardly thus flexing inwardly the inner presser strap middle segment 132c.

It is desired, during the lasting of the shoe, that the top line 498 of the side portions of the upper 482 be clamped against the last 478 and remain stationary on the last while the side portions of the upper extending from the top line towards the last bottom and the insole 480 have any slack and wrinkles taken out and then be pressed tightly against the last. This is accomplished by virtue of the fact that the bottom segment 134a first rigidly clamps the top line 498 to the last after which the outer presser strap top segment 130b is moved against the shoe assembly followed by a movement of the inner presser strap top segment 132b against the shoe assembly. The movement of the pressure straps against the shoe assembly causes the lasting strap middle segment 134c to flex and press the upper between the top line and the insole bottom against the last while conforming to the shape of the last. Since the outer presser top segment 130b is lower than the inner pressure strap segment 132b, the pressure applied by the lasting strap middle segment 134c against the upper commences at its bottom proximate to its rigid bottom segment 134a and works its way upwardly. Therefore, the upper is progressively urged upwardly of the top line as it is pressed against the last thus pressing the upper against the last in a wrinkle free manner. At the completion of the pressing of the upper against the last by the lasting strap middle segment 134c, the lasting strap top segment 134b extends upwardly of the insole 480 and outwardly of the upper margin 496 as indicated in FIG. 33.

From the foregoing it can be seen that, at the time the motors 96 are actuated to move their piston rods 98 inwardly, the lasting instrumentalties must be on opposite sides of the shoe assembly 476 in positions that are close to but not in engagement with the shoe assembly and that these positions are determined by the engagement of the bolts 492 with the flanges 494.

When operating on a left foot shoe assembly, with the toe rest 24 on the longitudinal center line of the machine, the left side of the shoe assembly (the upper side in FIG. 31A) projects further from the longitudinal center line of the machine than the right side of the shoe assembly (the lower side in FIG. 31A). Therefore, with a left foot shoe assembly and with the toe rest 24 located on the longitudinal center line of the machine, when the motors 74 have completed the inward movement of the lasting instrumentalties 126 due to the engagement of the bolts 492 with the flanges 494, the lasting instrumentalties 126 on the left side (FIG. 1) of the machine will be closer to its associated side of the shoe assembly 476 than the lasting instrumentalties on the right side of the shoe assembly. In some instances, the lasting instrumentalties on the left side of the machine may actually be in engagement with the shoe assembly. It is for the purpose of avoiding this undesirable condition that the toe end of the shoe assembly 476 was caused to swing rightwardly about the axis of the last pin 20, by the motor 488.

As shown in FIG. 31A, the right side of the last 478 of the left foot shoe assembly 476 (the bottom side as seen in FIG. 31A) has a reentrant portion 500 that curves inwardly of and between the toe and heel portions of the side of the last. The other side of the last has a much less pronounced reentrant portion.

In addition to the operation of the motor 96, after the engagement of the bolts 492 with the flanges 494 pressurized air is sent under relatively low pressure to the blind ends of the motors 150 on the right side of the machine as seen in FIG. 1 to thereby force the piston rods 158 of these motors inwardly at a lower pressure than the pressure that had been applied to the motors 96. The pressurized air is admitted to the blind ends of these motors 150 at the same time as it is admitted to the blind ends of the motors 96. However, due to the pressure of the air entering these motors 150 being lower than the pressure of the air entering the motors 96, the actuation of these motors 150 to force their piston rods 158 inwardly is delayed until the outer presser straps 130 have been flexed inwardly to cause the upper 482 to conform snugly to the shape of the last 478 and to press the upper against the last.

The actuation of the right motors 150, as seen in FIG. 1, forces the associated lasting strap top segments 134b on the right side of the machine, as seen in FIGS. 1 and 33, inwardly under the relatively low pressure to provide an inwardly directed back-up force that folds each lasting strap top segment 134b downwardly about its juncture with its lasting strap middle segment 134c so that the top segment 134b forms an acute angle with respect to the insole 480, this being permitted by the flexible connection provided by the ball and socket connections 154, 156. This causes the upper margin 496 on the side of the shoe assembly having the reentrant portion 500 to be folded downwardly about the periphery of the insole, part way towards the insole, as indicated in FIG. 33, to form an acute angle with the insole.

Figure 32:
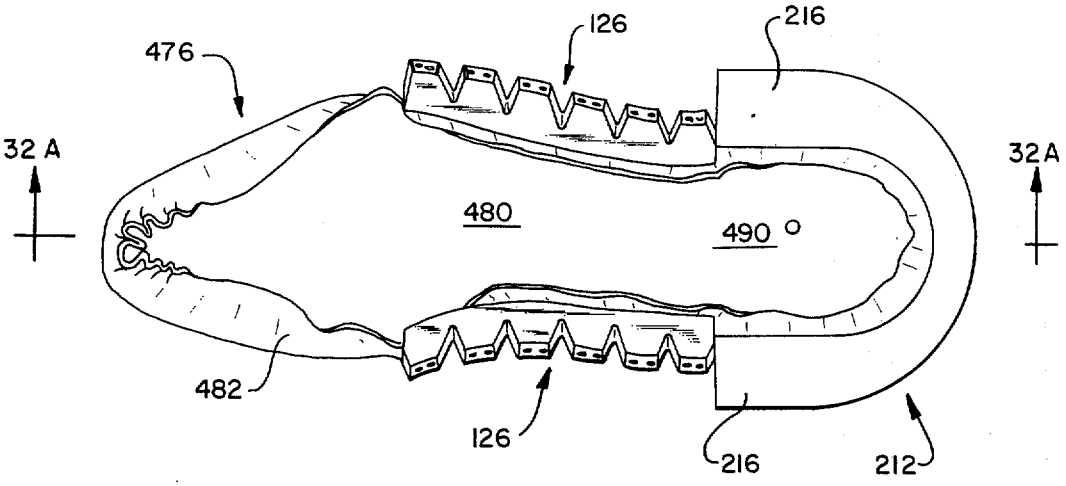
FIG. 32 is a plan view of the shoe assembly as it appears in the machine after the side and heel portions of the upper have respectively been clamped to the last by the side lasting instrumentalities and a heel clamp.

The shoe assembly engaging parts are now in the position shown in FIG. 32 with the pad 212 pressing the heel portion of the upper 482 againts the last 478 and the lasting instrumentalties 126 pressing the side portions of the upper margin against the last, the lasting instrumentalties 126 being located forwardly of the pad 212 with substantially no space between the rearmost lasting instrumentalties 126 and the fronts of the pad legs 216.

The motor 295 is now actuated so as to cause the cables 302 to move the slide 294 and the parts carried thereby, including the nozzles 396, forwardly until the valve actuating rod 314 engages the stop lug 334. The stop lug 33 is so located that it is engaged by the rod 314 at a location such that the nozzles 396 are over the widest part of the shoe assembly, indicated by number 502 in FIG. 31A. The engagement of the rod 314 by the lug 334 causes the valve 310 to open.

Figure 30:
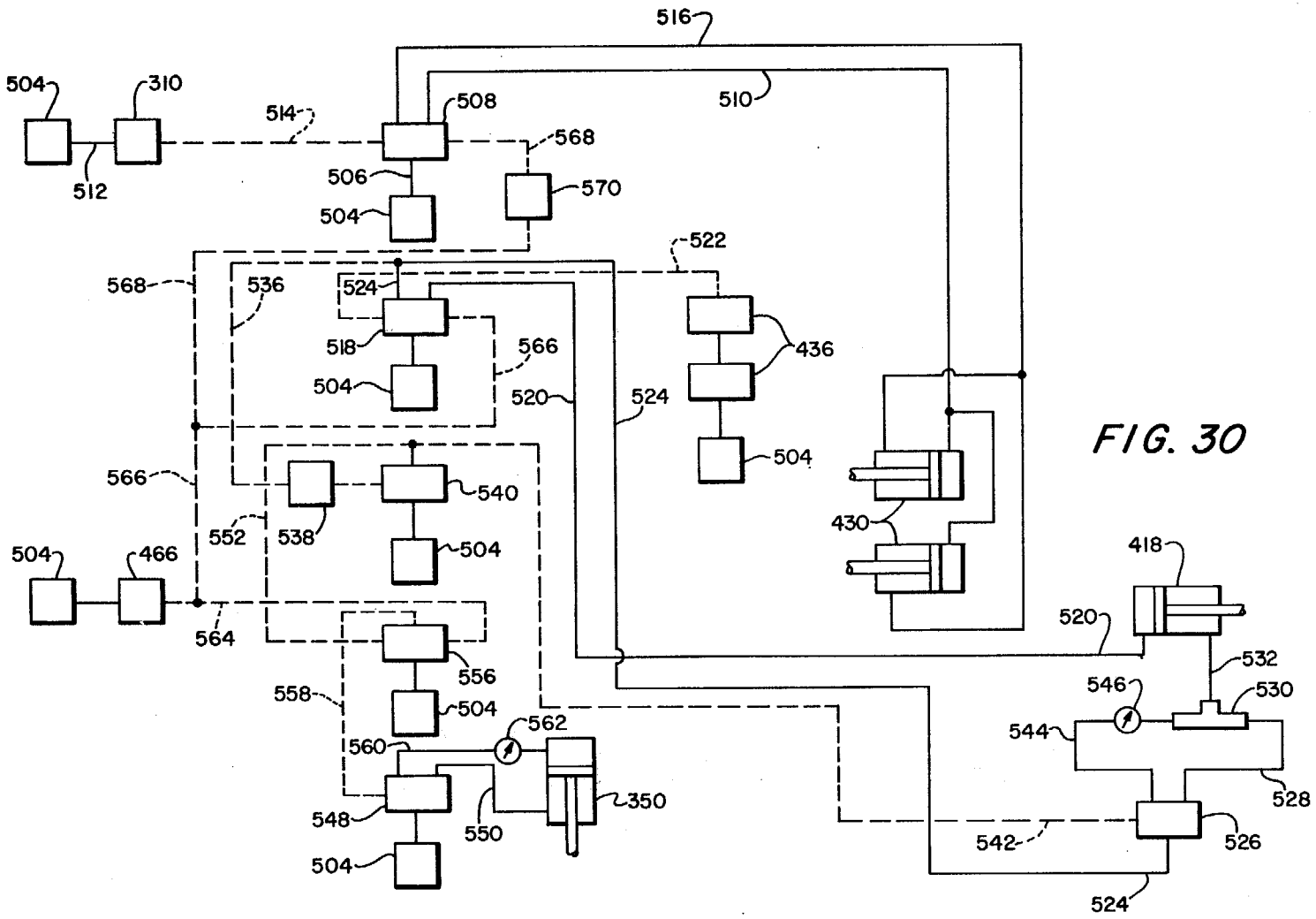
FIG. 30 is a schematic representation of a portion of the machine control circuit.

Referring to FIG. 30, the motors 430 are maintained in their idle positions by pressurized air passing from a source 504 through a line 506, a valve 508 and a line 510 to the blind ends of these motors. The opening of the valve 310 sends air from the source 504 through a line 512, the valve 310 and a pilot line 514 to the left side of the valve 508 to shift the valve 508. This shifting of the valve 508 vents the air from the blind ends of the motors 430 through the line 510 and the valve 508 and enables pressurized air to pass from the valve 508 through a line 516 to the rod ends of the motors 430 to thereby retract the piston rods 434 into the motors 430 and thus cause the nozzles 396 to be lowered under the yieldable force of the pressurized air in the motors 430 until they engage the insole 480 in the general region indicated by number 502 in FIG. 31A wherein the nozzles are spaced from the upper margin 496 and the insole periphery laterally of the side portions of the upper margin and the corresponding portions of the insole periphery that are between the toe and heel portions of the shoe assembly.

As described above, the toe portion of the shoe assembly 476 was swung rightwardly by the motor 488. In order to ensure that the nozzles engage the insole 480 inwardly of the upper margin 496, the nozzles were also swung rightwardly. As described above, by the admission of the relatively high pressure air to the left motor 378 as seen in FIG. 1 which is the top motor 378 in FIG. 23.

The motor 418 is maintained in its idle condition by pressurized air passing from the source 504 through a valve 518 and a line 520 to the motor 418. The lowering of the nozzles 396 causes the valves 436, which are normally closed, to open. The opening of the valves 436 enables pressurized air to pass from the source 504 through the valves 436 and a pilot line 522 to the left side of the valve 518 to shift this valve. The shifting of the valves 518 enables the air in the line 520 to vent to atmosphere through the valve 518 and enables pressurized air to flow from the valve 518 through a line 524, a valve 526, a line 528, a shuttle valve 530 and a line 532 to the motor 418 to so actuate the motor 418 as to move the yokes 414 inwardly under the yieldable force of the pressurized air operating under relatively high full line pressure in the line 532 and thus move the nozzles 396 outwardly under relatively high pressure along the insole 480 into the angle between the insole and the upper margin 496 until the nozzles reach the corners between the insole and the upper margin as indicated in FIG. 33.

It is desirable that the nozzles 396, in moving into these corners, first move downwardly against the insole and then move outwardly along the insole into the corners to ensure that the nozzles will not tangle with the upper margin which, as indicated in FIG. 33, is overhanging the insole 480 and extending inwardly of the insole periphery at this time, and to ensure that the nozzles do not move outwardly of the upper margin before moving downwardly. This desirable sequence is ensured by causing the outward movement of the nozzles to take place in response to the downward movement of the nozzles which causes the opening of the valves 436, the opening of the valves 436 in turn causing the outward movement of the nozzles to take place.

By means not shown, the opening of the valves 436 also shuts off the flow of pressurized air to the motors 378 so that the return springs 534 (FIG. 24) of these motors retract their piston rods 380 out of engagement with the bolt heads 276 to thereby enable the motor 418 to move the nozzles 396 outwardly.

The aforementioned shifting of the valve 518 that had caused the pressurized air to flow through the line 524 to the motor 418 also enabled pressurized air to flow from the line 524 through a pilot line 536 and a pneumatic timer 538 in the line 536 to the left side of a valve 540 to shift the valve 540 after a time delay provided by the timer 538. The shifting of the valve 540 enables pressurized air to flow from the source 504 through the valve 540 and a pilot line 542 to the left side of the valve 526 to shift the valve 526. The shifting of the valve 526 cuts off the flow of pressurized air through the line 528 and enables pressurized air to flow under relatively low pressure from the valve 526 through a line 544, a pressure regulator 546 in the line 544 set a pressure lower than the pressure of the air that had flowed through the line 528, the shuttle valve 530 and the line 532 to the motor 418 to cause the motor 418 to urge the nozzles 396 outwardly into the corners between the insole 480 and the upper margin 496 at a lower pressure than they had been originally urged outwardly.

Now the motor 328 is acutated to lower the stop lug 334 and disengage it from the valve actuating rod 314 thus causing the valve 310 to close the enabling the motor 295 to again move the plate 294 and the nozzles 396 forwardly. During this resumption of the forward movement of the nozzles 396, they are resiliently urged downwardly against the insole 480 by the motors 430 and are resiliently urged outwardly against the upper margin 496 under relatively low pressure by the motor 418 so that they are bearing against the insole and the upper margin when they stop their forward motion as described below. The nozzles 396 are urged outwardly against the upper margin 496 under relatively low pressure during their forward movement and during their below described rearward movement so that they will not tear or gouge the margin during these movements. The nozzles 396 are initially urged outwardly under relatively high pressure so as to rapidly move them outwardly into the corners between the upper margin 496 and the insole 480 thereby ensuring that they are in the corners when the nozzles resume their forward movement and and when the nozzles meet resistance to continued forward movement at the boundaries between the wiped toe portion of the upper margin and the unwiped side portions of the upper margin as described below.

As shown in greater detail in application Ser. No. 386,129, the machine control is so constructed that, in response to the lowering of the stop lug 334 to enable the slide plate 294 and the nozzles 396 to resume their forward movement, the motor 295 is caused to reverse its movement and move the slide plate 294 and the nozzles 396 rearwardly. The control is so constituted that the nozzles 396, at the conclusion of their forward movement, are located at the boundaries between the wiped toe portion of the upper margin and the unwiped side portions of the upper margin. Since the block 368, together with the nozzles 396, can swing about the axis of the post 370, the block, together with the nozzles, swing about this axis in one direction or the other should one nozzles arrive at this boundary before the other.

At the same time as the slide plate 294 and the nozzles 396 commence their rearward movement, pressurized air is caused to flow, by means described below, to the blind end of the motor 350 to thereby move the plunger 354 downwardly at a regulated speed past the orifice 344 and force cement through the passage means 398, the check valves 404 and the passages 400 in the nozzles 396 into the angle between the upper margin 496 and the insole 480.

The aforementioned opening of the valve 310 caused pressurized air to flow into the bottom of the cavity 458 to thereby raise the cylinder 456 to bring the stop member 470 and the valve assembly 466 into intersecting relationship with the cam 474. At this time, the cam 474 is forward of the stop surface 470 and the valve assembly 466 so that it does not intersect them during the forward movement of the plate 294. The plate 294, together with the nozzles 396, continues its rearward movement until the back of the cam 474 engages the stop surface 470 and engages the valve assembly 466 to thereby open the valve assembly 466. The aforementioned forward movement of the main slide plate 164 to bring the bight 214 of the heel clamp pad into abutment with the heel end of the shoe assembly 476 had also moved the lug 450 forwardly. The lug 450, in this forward movement, pushes the block 442, together with the stop surface 470 and the valve assembly 466, forwardly against the force of the spring 448. The stop surface 470 is located in a forward-rearward position that is dependent on the forward-rearward position of the heel end extremity of the shoe assembly 476. The machine parts are so dimensioned that the forward-rearward distance between the stop surface 470 and the pad bight 214 is substantially equal to the forward-rearward distance between the back of the cam 474 and the nozzles 396. Therefore, regardless of the length of the shoe assembly 476 and the forward-rearward position of the heel portion of the shoe assembly, the nozzles 396 are located proximate to the heel end portion of the corner between the insole 480 and the upper margin 496 when the plate 294 and the nozzles 396 terminate their rearward movements.

During the rearward movements of the nozzles from the boundary of the unwiped side portion of the upper margin 496 with the previously wiped toe portion of the upper margin to locations that are proximate to the heel end extremity of the shoe assembly 476, the cement is continuously being extruded from the nozzle passages 400 into the angle between the upper margin 496 and the insole 480, the nozzles 396 are continuously being yieldably urged downwardly against the insole 480 by the motors 430, and the nozzles 396 are continuously being urged yieldably outwardly, under relatively low pressure, against the upper margin 496 by the motor 418, as shown in FIG. 33. Therefore, during the rearward cement extruding movement of the nozzles 396 they are able to remain in the angle between the insole 480 and the upper margin 496 in desirable positions for the extrusion of the cement regardless of the contour of the bottom of the insole and regardless of the contour of the insole periphery.

The relatively low back-up force exerted against the reentrant portion 500 on the right side of the shoe assembly 476 to fold the lasting strap top segments 134b part way towards the insole forces the partially folded upper margin 496 on the right side of the shoe assembly against the periphery of the insole 480 to create a barrier between the upper margin and the insole that inhibits the creeping of the cement between the upper margin and the insole and then between the upper 482 and the sides of the last 478. As noted in FIG. 33, the angle formed between the side of the last and the bottom of the last on the right side of the shoe assembly having the reentrant portion 500 is an acute angle which is smaller than the angle, which is close to a right angle, formed between the left side of the last and the bottom of the last. Therefore, the need for folding the lasting strap top segments 134b on the right side of the last partway towards the insole does not exist with respect to the lasting segments 134b on the left side of the last. By not folding the upper margin 496 on the side of the shoe assembly 476 not having the reentrant portion 500, the nozzles 396 on that side of the shoe assembly may move further outwardly under the force imparted thereto by the motor 418 until it meets resistance from the upper margin 496 and thus be positioned close to and extrude cement close to the periphery of the insole 480 which enhances the quality of the bond between the upper margin and the insole effected by the wiping operation described below. It is for these reasons that the left motors 150 (FIGS. 1 and 33) were not actuated, as were the right motors 150 to force their piston rods 158 inwardly under relatively low pressure.

The heel portion of the upper margin 496 is held upright and pressed against the last 478 by the heel clamp 212 to thereby enable the nozzles 396 to stay in the corner between this portion of the upper margin and the corresponding portion of the insole periphery as the nozzles move past this portion of the upper margin.

The motor 350 is maintained in its idle condition by pressurized air passing from the source 504 through a spring return valve 548 and a line 550 to the rod end of this motor. The motor 350 was actuated to force cement through the nozzles 396 pursuant to the aforementioned shifting of the valve 540 which, in addition to enabling the flow of pressurized air through the pilot line 542, enabled pressurized air to flow from the valve 540 through a pilot line 552 to the left side of a valve 556 to shift the valve 556. The shifting of the valve 556 enabled pressurized air to flow from the source 504 through the valve 556 and a pilot line 558 to the left side of the valve 548 to shift the valve 548. The shifting of the valve 548 cut off the flow of pressurized air in the line 550 and enabled pressurized air to flow from the valve 548 through a line 560 and a pressure regulator 562 in the line 560 to the blind end of the motor 350 to actuate the motor 350 to force cement through the nozzles 396.

The aforementioned opening of the valve assembly 466 enables pressurized air to flow from the source 504 through the valve assembly 466 and a pilot line 564 to the right side of the valve 556 to thereby shift the valve 556 back to its original position so that the flow of pressurized air in the pilot line 558 to shut off. The shutting off of the air flow in the line 558 enables the return spring in the valve 548 to return this valve to its original position to thereby cut off the flow of air in the line 560 and causes the pressurized air to again flow in the line 548 and thus actuate the motor 350 to return to its idle condition so as to cut off the flow of cement through the nozzles 396.

The opening of the valve assembly 466 also enables pressurized air to flow from the valve 466 through a pilot line 566 to the right side of the valve 518 to thereby shift this valve back to its original position so that the flow of air in the line 524 is cut off and pressurized air again flows through the line 520 to the motor 418 to thereby cause the motor 418 to swing the nozzles 396 inwardly and away from the upper margin 496 proximate to the heel end extremity of the upper margin.

The opening of the valve assembly 466 also enables pressurized air to flow from the line 566 through a pilot line 568 and a pneumatic timer 570 in the line 568 to the right side of the valve 508 to thereby shift this valve back to its original position so that the flow of air in the line 516 is cut off and pressurized air again flows through the line 510 to the motors 430 to cause the motors 430 to return to their idle position to thereby raise the nozzles 396 to their idle positions after a time delay imparted by the timer 570. This time delay enables the motor 418 to swing the nozzles inwardly of the upper margin 496 before they are raised upwardly of the insole 480 by the motors 430.

The opening of the valve assembly 466 also returns the motors 378 to their idle condition.

The opening of the valve assembly 466, after a time delay sufficient to enable the nozzles 396 to be raised clear of the shoe assembly 476, causes pressurized air under a higher pressure than had previously been applied to the right motors 150 to flow to the blind ends of all of the motors 150. This causes each motor 150 to force its piston rod 158 inwardly under relatively high pressure and thereby force the lasting strap top segment 134b inwardly over the insole periphery under relatively high pressure. This has the effect of forcing each lasting strap top segment 134b inwardly and downwardly to press the upper margin 496 against the insole 480. At this time, the rigid lasting strap bottom segments 134a are still clamping the top line 498 to the last, and the inward and downward force imparted to the lasting strap top segments 134b causes the lasting strap middle segment 134c to stretch, while the inner and outer presser straps 132 and 130 maintain their pressure against the shoe assembly 476, to thus force the portion of the upper 482 extending above the top line 498 upwardly and stretch the upper upwardly and tightly about the last while it is conforming to the shape of the last. The pressure applied by the presser straps 130 and 132 is light enough to allow this stretching of the lasting strap middle segments 134c to take place. The forcing down of each lasting strap top segment 134b against the insole causes the lasting strap top segments 134b to wipe or fold the side portions of the upper margin 496 against the insole 480 and bond the upper margin to the insole by means of the previously applied cement.

After the lasting strap top segments 134b have forced the side portions of the upper margin 496 against the insole 480 for a sufficient length of time as to enable the side portions of the upper margin to be effectively bonded to the insole, the motors 74, 96 and 150 are actuated to return the sets of lasting units 72 to their idle positions. This is followed by an actuation of the motor 248 to cause the wiper slide 244 to move forwardly thereby imparting motion to the wiper cams 254 and consequently the heel wipers 256 in a heel wiping stroke by means of the links 258. The heel wipers 256 are guided in their movement by the engagement of the cam slots 262 with the rollers 260 in a path that is both forwardly translating and inwardly swinging about the vertex 572 (FIG. 16) of the heel wipers. This causes the heel wipers 256 to engage the heel portion of the upstanding upper margin 496, that extends from the heel end extremity of the shoe assembly 476 to the rearmost ends of the side portions of the upper margin 496 that had been previously wiped against and bonded to the insole by the sets of lasting units 72, and wipe the heel portion of the upper margin against the insole heel seat portion 490 and bond it to the insole heel seat portion by means of the previously applied cement.

At about the same time as the actuation of the motor 248 to effect the heel wiping stroke, the flow of pressurized air to the cylinder 456 is cut off to thereby enable the springs 460 to lower the cylinder 456 to its idle condition to thereby lower the stop surface 470 out of intersecting relationship with the cam 474 and to thereby lower the valve assembly 466 away from the cam 474 so as to allow the valve assembly 466 to open. The lowering of the stop surface 470 out of intersecting relationship with the cam 474 enables the motor 295 to resume the rearward movement of the plate 294 and the nozzles 396 until they reach their idle positions.

At or near the end of the heel wiping stroke the motor 30 is so actuated as to cause the brake fingers 36 to disengage the flange 38 and thus unlock the support 40 for heightwise movement. At about the same time, air is introduced under increased bedding pressure to the motor 16 to cause the support 40 to be so forced upwardly as to press the wiped heel portion of the upper margin 496 against the bottoms of the heel wipers 256 to thereby flatten the wiped heel portion of the upper margin and enhance the bond between the heel portion of the upper margin and the insole heel seat portion 490. When this bedding pressure has been applied for a sufficient length of time, the machine parts that have not already done so are returned to their idle positions and the machine cycle is completed so that the lasted shoe assembly 476 can be removed from the machine.

Figure 32A:
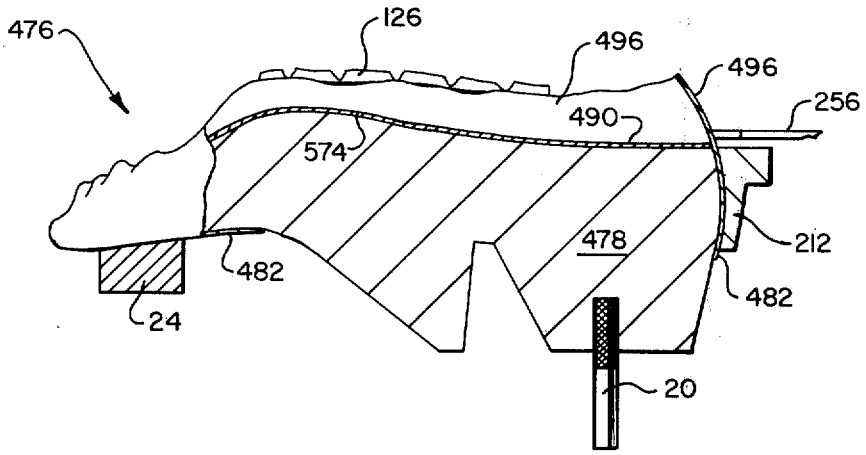
FIG. 32A is a section taken along the line 32A—32A of FIG. 32.

When the shoe assembly is in the FIG. 32A position during the cement extruding travel of the nozzles 396 along the insole periphery preparatory to the wiping of the side and heel portions of the upper margin against the insole, the upwardly facing bottom of the insole heel seat portion 490 lies in a substantially horizontal plane that is substantially parallel to the plane of the bottoms of the heel wipers 256. The shank portion 574 of the insole, at this time, rises upwardly and forwardly from the heel seat portion 490 at an incline that is dependent on the size and style of the shoe assembly 476. The lasting instrumentalties 126 should, at this time, extend in forward-rearward directions in an inclined plane that is approximately parallel to the plane of the insole shank portion 574. Prior to the start of the machine cycle, the shafts 66 had been rotated to cause the lasting instrumentalties 126 to swing in the appropriate direction about the axes of the pins 60 to thereby adjust the inclined plane of the lasting instrumentalties 126. If necessary, the shafts 50 had been rotated to raise or lower the lasting instrumentalties 126 to bring them to the apropriate elevation.

The shoe assembly 476 had been brought to the FIG. 32A position wherein the upwardly facing bottom of the insole heel seat portion 490 is in the substantially horizontal plane referred to in the preceding paragraph by causing the motor 16 to raise the shoe assembly so as to bring the insole heel seat portion against the hold-down 278. The shoe assembly had then been retained in this position by the operation of the motor 30 to cause the brake fingers 36 to bear against the flange 38, after which the hold-down 278 was disengaged from the shoe assembly. The hold-down 278 was disengaged from the shoe assembly with the shoe assembly retained in the FIG. 32A position by the brake fingers 36 so that the hold-down 278 would not be intersected by and interfere with the nozzles 396 during the rearward cement extruding movement of the nozzles and also would not be intersected by and interfere with the nozzles during the forward movement of the nozzles from their idle position to the location wherein the nozles were lowered against the insole.

When operating on a right foot shoe assembly, the operator will start the machine cycle by momentarily depressing the right control knob 484 (FIG. 1). This causes actuation of the motor 488 to swing the column 22 and the toe rest 24 leftwardly (FIG. 1). The depression of the right control knob 484 also admits air under relatively high pressure to the blind end of the right motor 378 as seen in FIG. 1 (the bottom motor 378 in FIG. 23) to thus project the piston rod 380 of this motor 378 forwardly under a pressure that is higher than the pressure projecting the piston rod of the other motor 378 forwardly. As a result, the block 368 is swung clockwise (FIG. 23) about the axis of the post 370 so as to swing the nozzles 396 leftwardly as seen from the front of the machine (upwardly in FIG. 23).

In a right foot shoe assembly, the left side of the last has the reentrant portion 500. In operating on the right foot shoe assembly, after the engagement of the bolts 492 with the flange 494, pressurized air is sent under relatively low pressure to the blind ends of the motors 150 on the left side of the machine as seen in FIG. 1 to thereby force the piston rods 158 of these motors inwardly at a lower pressure than the pressure that had been applied to the motors 96. The actuation of these motors 150 forces the associated lasting strap top segments 134b on the left side of the machine, as seen in FIGS. 1 and 33, inwardly under relatively low pressure to provide the inwardly directed back-up force described above with respect to the left foot shoe assembly and to cause the upper margin 496 on the side of the right foot shoe assembly having the reentrant portion 500 to be folded downwardly part way towards the insole.

In a right foot shoe assembly, when the toe rest 34 is on the longitudinal center line of the machine, the right side of the shoe assembly (the lower side in FIG. 31A) projects further from the longitudinal center line of the machine than the left side of the shoe assembly (the upper side in FIG. 31A). Therefore, with the right foot shoe assembly and with the toe rest 24 located along the longitudinal center line of the machine, when the motors 74 have completed the inward movement of the lasting instrumentalties 126 due to the engagement of the bolts 492 with the flanges 494, the lasting instrumentalties 126 on the right side of the machine (FIG. ) will be closer to their associated side of the shoe assembly 476 that the lasting instrumentalties on the left side of the shoe assembly. Therefore, the leftward swinging of the toe rest 32 and the nozzles 396, in operating on a right foot shoe assembly, enables the sides of the shoe assembly to be spaced the desired distance inwardly from the lasting instrumentalties 126 when the lasting instrumentalties have completed their inward movement pursuant to the operation of the motors 74. The leftward movement of the nozzles 396, in operating on a right foot shoe assembly, ensures that the nozzles engage the insole 480 inwardly of the upper margins 496 when the nozzles are lowered against the insole 480 by the motors 430.

In all other respects the machine cycle in operating on a right foot shoe assembly is identical to the above described machine cycle in operating on a left foot shoe assembly.

I claim:

1. A cement lasting machine, operable on a shoe assembly formed of a last having an upper mounted thereon and an insole located on its bottom, for applying cement in the corner between a particular portion of the margin of said upper and the periphery of *the corresponding portion of* the insole and for wiping said margin portion against the insole comprising: wiping means mounted for movement, in a prescribed plane substantially parallel to the bottom of the wiping means, in a wiping stroke between a retracted position and an advanced position; a bar mounted for heightwise movement in a path that is at right angles to said plane; a [show] *shoe* assembly support secured to and extending upwardly of the bar for so supporting the shoe assembly bottom-up that said insole portion substantially lies in a plane parallel to said prescribed plane; brake means cooperative with the bar and movable between a braking position wherein it locks the bar against said heightwise movement and an open position wherein it permits said heightwise movement; a hold-down mounted for movement between a remote position spaced from the shoe assembly and a working position in a prescribed location above the support wherein the bottom of the hold-down lies in a wiping plane that is substantially coextensive with the bottom of the wiping means; a cement applying member mounted for heightwise movement towards and away from the insole and mounted for cement applying movement between a starting position and a final position along said corner past said prescribed location; means for initially retaining the wiping means in its retracted position; means for initially retaining the bar, together with the support, in a lower position; means for initially retaining the brake means in its open positions; means for initially retaining the hold-down in its working position; means for initially retaining the cement applying member in an upper position above said starting position; means for thereafter [raising] *applying an upwardly directed yieldable force to the bar to yieldably raise* the bar, together with the support, [under a yieldable force] to cause said insole portion to bear against the hold-down and thus locate said insole portion in said wiping plane; means, operative after said insole portion has been located in said wiping plane, for lowering the cement applying member into said starting position; means, operative after said insole portion has been located in said wiping plane, for causing the brake means to move into said braking position; means, operative after the brake means has moved into said braking position, for causing the hold-down to move to said remote position whereby said insole portion is retained in said wiping plane by said brake means; means for thereafter causing the cement applying member to effect its cement applying movement, the movement of the hold-down to said remote position preventing interference between the cement applying member and the hold-down during said cement applying movement; means enabling cement to be applied by said cement applying member into said corner during said cement applying movement; means for thereafter raising the cement applying member upwardly of the insole; [and] means for thereafter moving the wiping means through said wiping stroke to wipe said margin portion against the corresponding portion of the insole and bond said margin portion to the corresponding portion of the insole by means of the cement; *and means, operative after the commencement of the wiping stroke, for causing the brake means to return to its open*

*position to thereby enable said yieldable force to press the wiped margin portion against the bottom of the wiping means.*

2. The machine of claim 1 further comprising: a stationary sleeve in which said bar is mounted for said heightwise movement; and a flange mounted to the bar for heightwise movement therewith; and wherein said brake means comprises: a pair of arms movably mounted to opposite sides of said sleeve; and a brake finger mounted to a first end of each arm so that the brake fingers are located on opposite sides of and in registry with the flange; and wherein the means for retaining the brake means in its open position and for causing the brake means to move into said braking position comprises: a motor connected to the ends of the arms remote from the brake fingers.

3. A method, operable on a shoe assembly formed of a last having an upper mounted thereon and an insole located on its bottom, for applying cement in the corner between a particular portion of the margin of said upper and the periphery of the corresponding portion of the insole and for wiping said margin portion against said insole comprising: providing wiping means mounted for movement, in a prescribed plane substantially parallel to the bottom of the wiping means, in a wiping stroke between a retracted position and an advanced position; providing a bar mounted for heightwise movement in a path that is at right angles to said plane; providing a shoe assembly support that is secured to and extends upwardly of the bar; so supporting the shoe assembly bottom-up on the support that said insole portion substantially lies in a plane parallel to said prescribed plane; initially retaining the wiping means in its retracted position; initially retaining the bar, together with the support, in a lower position; placing a hold-down in a working position in a prescribed location above the support wherein the bottom of the hold-down lies in a wiping plane that is substantially coextensive with the bottom of the wiping means; thereafter [yieldably raising] *applying an upwardly directed yieldable force to the bar to yieldably raise* the bar, together with the support, to cause said insole portion to bear against the hold-down and thus locate said insole portion in said wiping plane; thereafter locking the bar against the heightwise movement; thereafter moving the hold-down away from said working position to a remote position spaced from the shoe assembly whereby said insole portion is retained in said wiping plane by said locking of the bar; thereafter causing a cement applying member to have cement applying movement between a starting position and a final position along said corner past said prescribed location, the movement of the hold-down to said remote position preventing interference between the cement applying member and the hold-down during said cement applying movement; applying cement by the cement applying member into said corner during said cement applying movement; thereafter raising the cement applying member upwardly of the insole; [and] thereafter moving the wiping means through said wiping stroke to wipe said margin portion against the corresponding portion of the insole and bond said margin portion to the corresponding portion of the insole by means of the cement; *and, after the commencement of the wiping stroke, unlocking the bar to thereby enable said yieldable force to press the wiped margin portion against the bottom of the wiping means.*

*4. The machine according to claim 1 further comprising: means, operative at about the same time as the brake means is caused to return to its open position, for increasing the extent of said yieldable force.*

*5. The method according to claim 3 further comprising: increasing the extent of said yieldable force at about the same time as the bar is unlocked.*

* * * * *